United States Patent
Rudd, III

(10) Patent No.: US 7,039,517 B2
(45) Date of Patent: May 2, 2006

(54) BRAKE CONTROL SYSTEM

(75) Inventor: Robert Edward Rudd, III, Panton, VT (US)

(73) Assignee: Goodrich Corporation, Charlotte, NC (US)

(*) Notice: Subject to any disclaimer, the term of this patent is extended or adjusted under 35 U.S.C. 154(b) by 0 days.

(21) Appl. No.: 11/077,902

(22) Filed: Mar. 11, 2005

(65) Prior Publication Data
US 2005/0159873 A1 Jul. 21, 2005

Related U.S. Application Data

(62) Division of application No. 10/425,925, filed on Apr. 29, 2003, now Pat. No. 6,882,920.

(51) Int. Cl.
G06F 19/00 (2006.01)
B60T 8/60 (2006.01)

(52) U.S. Cl. ............ 701/71; 701/70; 701/83; 701/91; 303/155

(58) Field of Classification Search .......... 701/71, 701/78, 83, 91, 70, 3, 9, 14; 303/112, 150, 303/167, 176, 155, 163, 126, 195
See application file for complete search history.

(56) References Cited

U.S. PATENT DOCUMENTS

| | | | |
|---|---|---|---|
| 3,709,565 A | 1/1973 | Jonason et al. | 303/182 |
| 3,880,475 A * | 4/1975 | Booher | 303/195 |
| 3,920,282 A | 11/1975 | DeVlieg et al. | 303/115.5 |
| 4,022,513 A | 5/1977 | Hirzel et al. | 303/126 |
| 4,037,882 A | 7/1977 | Taylor | 303/178 |
| 4,140,352 A * | 2/1979 | Delpech et al. | 303/126 |
| 4,367,529 A | 1/1983 | Masclet et al. | 701/79 |
| 4,679,866 A | 7/1987 | van Zanten et al. | 303/167 |
| 4,715,662 A | 12/1987 | van Zanten et al. | 303/150 |
| 5,050,940 A | 9/1991 | Bedford et al. | 303/166 |
| 5,699,521 A | 12/1997 | Iizuka et al. | 709/240 |

(Continued)

FOREIGN PATENT DOCUMENTS

DE 25 30 609 A1 12/1973

(Continued)

Primary Examiner—Tan Q. Nguyen
(74) Attorney, Agent, or Firm—Renner, Otto, Boisselle & Sklar LLP

(57) ABSTRACT

According to the present invention, there is provided a method and system for providing brake control, autobrake and antiskid brake functionality by recognizing that the only difference between the three functions is the amount of deceleration they allow. Unlike a conventional system where the pedals represent brake pressure, the present invention interprets pedal commands as desired deceleration. The method and system involve controlling acceleration of a wheel reference speed and setting a desired slip based on autobrake settings, pedal positions, and various parameters. A proportional/integral/derivative algorithm controls wheel speed and is monitored for normal operation. Abnormal operation generates control parameters which are used to alter the wheel reference speed and its deceleration. Additionally, vehicles using the invention will benefit from improved yaw stability, even brake temperatures and differential braking during antiskid operation.

19 Claims, 18 Drawing Sheets

U.S. PATENT DOCUMENTS

| | | | |
|---|---|---|---|
| 5,918,951 A | 7/1999 | Rudd, III | 303/150 |
| 5,951,122 A * | 9/1999 | Murphy | 303/163 |
| 5,956,106 A | 9/1999 | Petersen et al. | 349/64 |
| 6,088,646 A * | 7/2000 | Wiel | 701/77 |
| 6,125,318 A * | 9/2000 | Zierolf | 701/71 |
| 6,178,370 B1 | 1/2001 | Zierolf | 79/71 |
| 6,220,676 B1 | 4/2001 | Rudd, III | 303/150 |
| 6,241,325 B1 | 6/2001 | Gowan et al. | 303/176 |
| 6,711,488 B1 * | 3/2004 | Zierolf | 701/71 |
| 6,722,745 B1 * | 4/2004 | Salamat et al. | 303/126 |
| 6,882,920 B1 | 4/2005 | Rudd, III | 701/71 |
| 2003/0120413 A1 * | 6/2003 | Park et al. | 701/71 |

FOREIGN PATENT DOCUMENTS

| | | |
|---|---|---|
| EP | 0 384 071 A1 | 8/1990 |
| GB | 1 585 321 | 2/1981 |

* cited by examiner

BRAKE CONTROL SYSTEM

REFERENCE TO RELATED APPLICATION

This is a divisional application of application Ser. No. 10/425,925, filed Apr. 29, 2003, now U.S. Pat. No. 6,882,920, the entire disclosure of which is hereby incorporated herein.

FIELD OF THE INVENTION

The present invention relates generally to brake control systems, and more particularly to antiskid and autobrake control systems for aircraft.

BACKGROUND OF THE INVENTION

Brake control systems have been in widespread use for several years. Generally speaking, depressing a brake pedal allows pressure from a hydraulic supply to reach the brake. Brake pressure creates a force on brake rotors and stator which thru brake friction create a torque decelerating the wheel. The wheel starts to slip which creates a drag force on the axle slowing down the vehicle.

Antiskid brake control systems also have been in widespread use for many years. In the simplest sense, an antiskid brake control system compares the speed of a vehicle derived from a wheel speed sensor (and wheel radius) to the vehicle speed derived from a secondary or reference source. If the wheel is determined to be skidding an excessive amount, then brake pressure applied to the wheel is released and the wheel is allowed to spin back up to the appropriate speed.

Autobrake brake control systems for aircraft have also been in widespread use for many years. Essentially, autobrake functionality allows the pilot to arm the rejected take off (RTO) setting prior to takeoff or to select from several automatic deceleration levels for landing. After landing, pressure is automatically applied to the brakes after touchdown independent of the pilot's brake pedals. In multiwheel vehicles, the same pressure is usually applied to all the wheels. The system regulates brake pressure to compensate for the effects such as aircraft drag, thrust reversers, and spoilers to maintain the selected deceleration level. A typical autobrake system has at least three levels of deceleration: low, medium, and maximum. Depending on the selected level of deceleration, the plane will automatically decelerate after landing.

In a manner similar to the autobrake systems, deceleration through pilot-controlled braking can also be assisted or controlled. A pilot-controlled system might function to obtain a desired deceleration from pilot pedals, rather than an autobrake setting. The desired deceleration setting is then used to scale the desired deceleration to a value between zero and the maximum deceleration of which the vehicle is capable based on factors such as aircraft geometry and tire/runway friction.

There are, of course, major problems that immediately become apparent in any brake control system. One problem is that antiskid, autobrake, and pilot-controlled braking are typically controlled by separate functions. When separated, it is possible for one type of calculated deceleration function, such as antiskid, to interfere with the calculation of another deceleration function, such as the autobrake function. Among the many challenges that must be overcome in designing an antiskid braking system are: the set point for an antiskid brake control is unknown because actual surface coefficients of friction are unknown; the system is unidirectional in that the wheel can only be slowed down by the brake; and system must have a brake with a response lag small enough to manage wheel locking that might occur after 2.5–5 milliseconds (ms) of braking.

In addition, determining the appropriate amount of skidding and the appropriate reference velocity can be particularly problematic. The appropriate amount of skidding is described by the much discussed but seldom measured mu-slip curve. Typically such curve is represented by the coefficient of friction $\mu$ (mu) between the wheel and the running surface on a vertical axis and the slip ratio on the horizontal axis. A slip ratio of zero is when the wheel is not skidding while a slip ratio equal to one represents a fully locked wheel.

The amplitude and peak location of the mu-slip curve unfortunately can vary substantially for different running surfaces or even the same running surface. A lower amplitude mu-slip curve may represent an ice or water patch. Ideally, the antiskid brake control system should allow the wheel to slip at the peak of the mu-slip curve which provides the maximum stopping power. Antiskid brake control systems are commonly accepted to be ninety percent efficient which means that, on average, the control system should be within ten percent of the mu-slip peak regardless of the value or location of the peak. However, since the mu-slip curve depends on so many variables (e.g., and without being limited thereby, tire tread groove pattern, tire tread compound, temperature, tire pressure, running surface material and finish, etc.), the mu-slip curve begins to resemble a random variable. This makes it difficult for conventional antiskid brake control systems to track adequately the peak of the mu-slip curve.

Recently there have been efforts to utilize optimal state estimation techniques, such as Kalman filters, in antiskid brake control systems. For example, U.S. Pat. No. 4,679,866 to van Zanten et al. discusses a method for ascertaining a set-point braking moment using a Kalman filter. U.S. Pat. No. 4,715,662 to van Zanten et al. describes a method for determining an optimal slip value using a Kalman filter. In addition, U.S. Pat. No. 6,220,676 to Rudd describes a sophisticated system and method for antiskid control and is incorporated herein by reference.

Autobrake systems typically apply the same pressure to each brake. Such application can create a lack of yaw stability because brake friction can vary substantially from brake to brake. The variation in brake friction can be due to differences in material, wear or temperature. Assume for the moment that brakes on the left side of the vehicle have twice the friction as those on the right. Equal pressure applied to each brake would result in twice as much torque and drag on one side of the vehicle than on the other. The unbalanced drag would cause the vehicle to veer sharply toward the side with increased torque. In an airplane, even if a pilot were able to keep the aircraft on the runway using the nose wheel, the uneven brake torque would cause the left wheel to heat up much more than the right. A hot brake takes longer to cool, thereby causing a potential delay in the departure of the plane's next scheduled flight.

Antiskid operation can also cause a lack of yaw stability, depending on the type of hydraulic valve used. If a cross wind occurs at high speed where nose wheel steering is disabled, a pilot would compensate for the wind by altering brake pressure. For example, if the cross wind causes a plane to veer left, the pilot can release pressure from the left brake pedal so that more brake pressure exists on the wheel than on the left, causing the plane to veer right and compensate for the cross wind. However, the pilot may be asking for three thousand pounds per square inch (psi) but the antiskid has determined that the runway will only support two thousand psi of hydraulic pressure. The pilot has to reduce pressure one thousand psi on the inside brake before any directional control occurs and during this time stopping distance is increasing.

Another situation where differential braking is desirable is when the left side of the vehicle is on a low friction surface and the right on a high friction surface where the pilot is requesting full pressure. The vehicle will normally veer to the right. The pilot will have to reduce the right pedal to regain directional control. Unfortunately, the right brake is capable of providing most stopping power in this situation so that stopping distance must necessarily increase at a time when the pilot has decided that minimum stopping distance is desired.

In view of the aforementioned shortcomings associated with conventional antiskid brake control systems, there is a need in the art for a combined brake control, autobrake and antiskid control system capable of accurately and reliably ascertaining and implementing relevant parameters.

BRIEF SUMMARY OF THE INVENTION

According to the present invention, there is provided a method for implementing brake control, autobrake and antiskid brake control of a wheel of a vehicle. The method comprises the steps of: receiving a brake command derived from at least a brake pedal input during operator-controlled braking and from at least an autobrake setting during autobraking; receiving a measured wheel speed of the wheel; and producing an output pressure signal for effecting brake pressure on the wheel, the output pressure signal being based on a comparison of the measured wheel speed and a calculated wheel speed set point as well wheel speed derived acceleration and wheel acceleration set point indicative of a predetermined deceleration and slip, the wheel speed set point being derived from at least the brake command and a wheel reference speed.

Also according to the present invention, there is provided a method for controlling the speed of a wheel of a vehicle. The method comprises: receiving a measured wheel speed; receiving a brake command derived from at least a brake pedal input during operator-controlled braking and from at least an autobrake setting during autobraking; generating a wheel speed set point indicative of a predetermined deceleration and slip, the wheel speed set point derived from at least the brake command and a wheel reference speed; and triggering an increase in the wheel reference speed and a momentary decrease of the predetermined deceleration based upon the integration of the difference between the measured wheel speed and the wheel speed set point.

Also according to the present invention, there is provided a method for controlling braking. The method comprises calculating a first acceleration received from a brake command from pilot or autobrake system; calculating a second acceleration from a change in reference wheel speed during an antiskid cycle; using the first acceleration to normalize the second acceleration; and calculating an acceleration modifier from the normalized second acceleration.

In further accordance with the present invention, there is provided a brake control, autobrake, and antiskid controller for effecting brake control of a wheel of a vehicle. The controller comprises an input for receiving a brake command derived from at least a brake pedal input during operator-controlled braking and from at least an autobrake setting during autobraking; an input for receiving a measured wheel speed of the wheel; and a control block for producing an output pressure signal for effecting brake pressure on the wheel, the output pressure signal being based on a comparison of the measured wheel speed and a calculated wheel speed set point indicative of a predetermined deceleration as well wheel speed derived acceleration and wheel acceleration set point, the wheel speed and acceleration set points being derived from at least the brake command and a wheel reference speed.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention incorporates brake control, autobrake and antiskid functionality into a single brake control system. To provide antiskid functionality, the present invention increases wheel reference speed upon detection of a significant difference between a measured wheel speed and a desired or commanded wheel speed trajectory and lowers ideal deceleration in response. Unlike conventional brake system, the brake pedals of the present invention represent the slip ratio and the desired deceleration trajectory, not the hydraulic pressure request.

The present invention also utilizes proportional, integral, and derivative terms in an unconventional manner. According to the present invention, for example, the proportional, derivative, and integral terms are multiplicative terms, rather than additive terms. While a conventional derivative term continually digests oscillations of the signal and has an output that is proportional to both the oscillation amplitude and frequency, the derivative term of the present invention has fixed duration and amplitude that is not a function of frequency content.

The present invention is capable of functioning with various types of braking systems, whether they are hydraulic or electric. Unlike conventional systems, the system of the present invention is designed such that the brake pedals control wheel deceleration and slip, not brake pad pressure (e.g. hydraulic pressure), which allows a constant foot pressure on a brake pedal to equate to a constant deceleration; even if the brakes are hot. This prevents situations where a vehicle veers because one brake heats up more than another. Thus, yaw stability is improved and differential braking is better maintained during antiskid operation when compared to a system where brake pedals control hydraulic pressure. In addition, because the pedals control deceleration, the system minimizes discrepancies in the heat generated by the various brakes during the braking process. Thus, because the heat is more evenly distributed, less time is required for the hottest brake to cool down, which minimizes potential delays between flights.

The present invention will now be described with reference to the drawings, wherein like reference labels are used to refer to like elements throughout.

Figure 1:
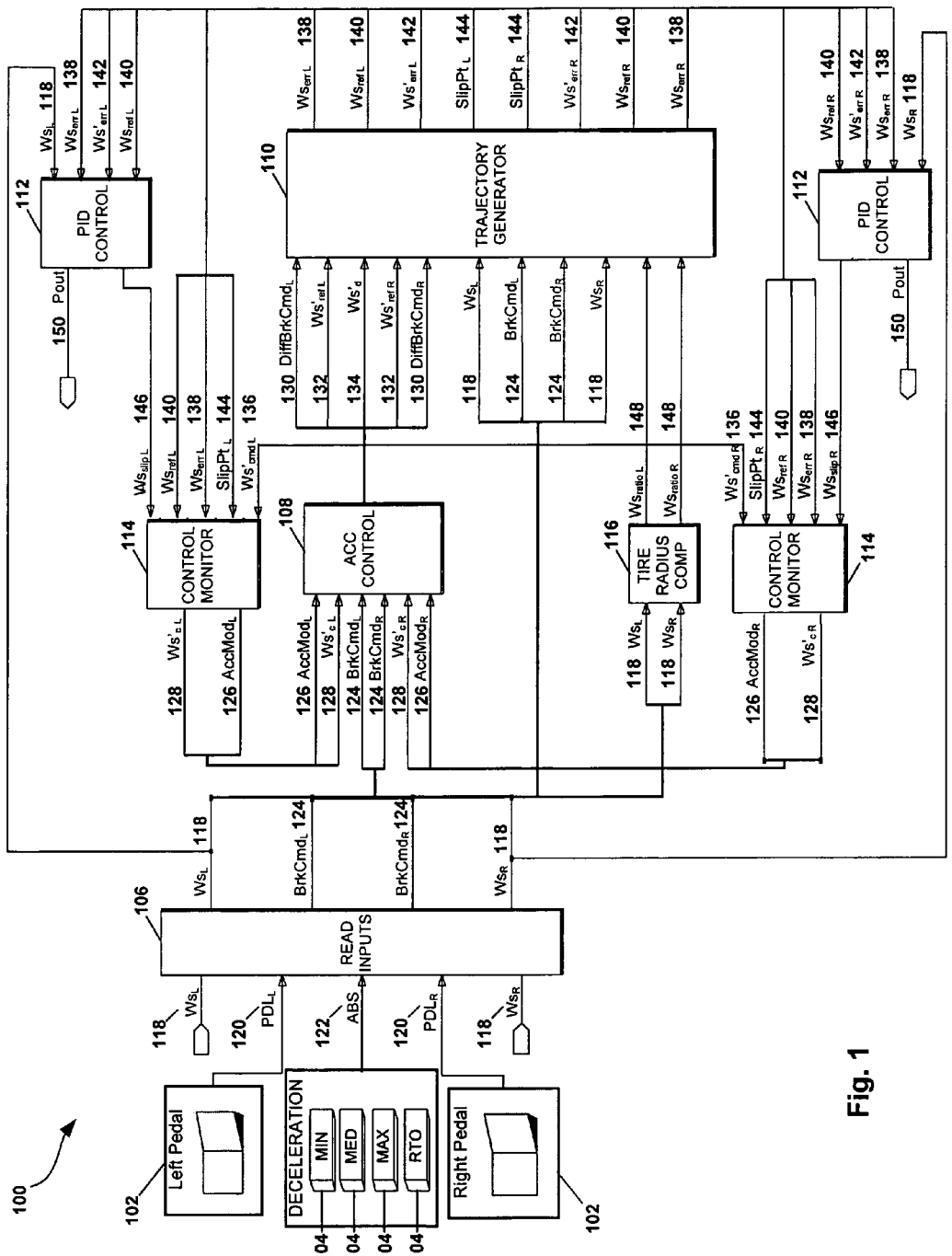
FIG. 1 is a diagram illustrating the basic elements of a brake control system according to the present invention.

Referring initially to FIG. 1, a diagram illustrating the basic elements of a brake control system 100 according to the present invention is provided. For sake of simplicity, the brake control system 100 represents a basic unit for controlling two wheels (left and right). However, it should be apparent to those skilled in the art that the brake control system 100 can be extended to vehicles having more wheels. Moreover, the preferred embodiment of the present invention provides a brake control system for controlling deceleration of an aircraft. Nevertheless, it will be appreciated that the brake control system 100 of the present invention has utility for virtually any type of vehicle and is not limited necessarily to aircraft.

It will also be apparent to those skilled in the art that the same underlying physics of the tire governs both antiskid and traction control systems and that relatively minor equation modifications can be made to the present invention to convert the brake control system into a traction control system, or to integrate traction control into the brake control system. For example, one can replace a brake pedal input with an acceleration pedal input and a brake pressure output with a throttle output to convert the present invention into a stand alone traction control system or integrated brake and traction control system.

While aircraft reference speed and wheel reference speed are often used interchangeably, one skilled in the art will recognize that aircraft reference speed is a linear velocity and wheel reference speed is a rotational velocity. The wheel reference speed is defined by the aircraft reference speed divided by the wheel radius. According to the present invention, the wheel reference speed is initialized to wheel speed after spin up but prior to braking. This initialization permits the system to function independent of, or without knowledge of, the wheel radius.

It will also be understood by those skilled in the art that different vehicles may require different numerical parameters or gains to be used in the control algorithm, particularly the control gains. For example, a four hundred passenger commercial transport will have a large wheel inertia that will respond more slowly than that of a two person private aircraft. It stands to reason that larger gains will be required for the control laws for the private aircraft.

As shown in FIG. 1, the control braking system has four main functional components: acceleration controller 108, trajectory generator 110, PID controller 112, and Control Monitor 114. In addition, the brake control system 100 shown includes an optional tire radii compensator 116 functional component. Where pilot-controlled braking occurs, a brake pedal input 120 (PDL) is determined from a pilot's depression of each of the brake pedals 102, such as a left brake pedal and a right brake pedal. Thus, at least one PDL 120 corresponding to the position of at least one brake pedal 102 is read at Input Reader 106 wherein the system inputs are read. In addition, an autobrake deceleration setting (ABS) 122 from an autobrake setting 104 is read at Input Reader 106.

Figure 2:
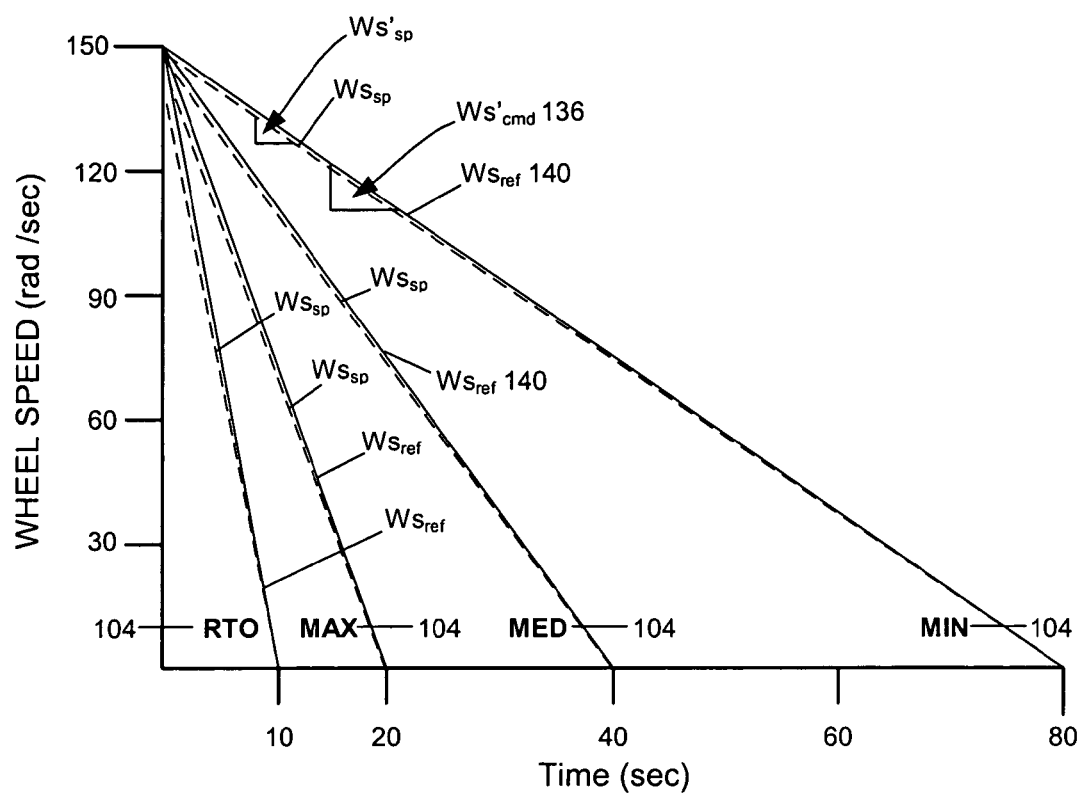
FIG. 2 is a plot of deceleration trajectories for various autobrake wheel speed set points.

The autobrake setting 104 is generally selected by a pilot and is discussed further herein with reference to FIG. 2. As shown, there are four autobrake settings 104: MIN, MEDIUM, MAX, and RTO, although additional autobrake settings 104 may exist. These settings may be set, for example, by switch or brake pedal input. It will be understood that the autobrake settings 104 may be vehicle-specific. Thus, the Input Reader 106 receives an ABS 122, and at least one PDL 120 as inputs. The PDL 120 can be generated by any means known in the art and represents the pilot controlled brake pedal 102 position. The PDL 120 may be scaled to a value between zero and one. Similarly, the ABS 122 can be a value between zero and RTO, where RTO is one. In addition, the Input Reader 106 is configured to receive left and right wheel speeds 118 (Ws). The wheel speed 118 can be determined by a wheel speed sensor, such as a variable reluctance device, or any other means for determining the actual speed of the wheel. From the received inputs, the Input Reader 106 generates outputs of Ws 118 and a brake command 124 (BrkCmd) for each wheel. The BrkCmd 124 is generated from the PDL 120 and/or the ABS 122, as is described herein with reference to FIG. 5. The output Ws 118 may be the same as the input Ws 118 such that Ws is not modified by Input Reader 106.

Figure 7:
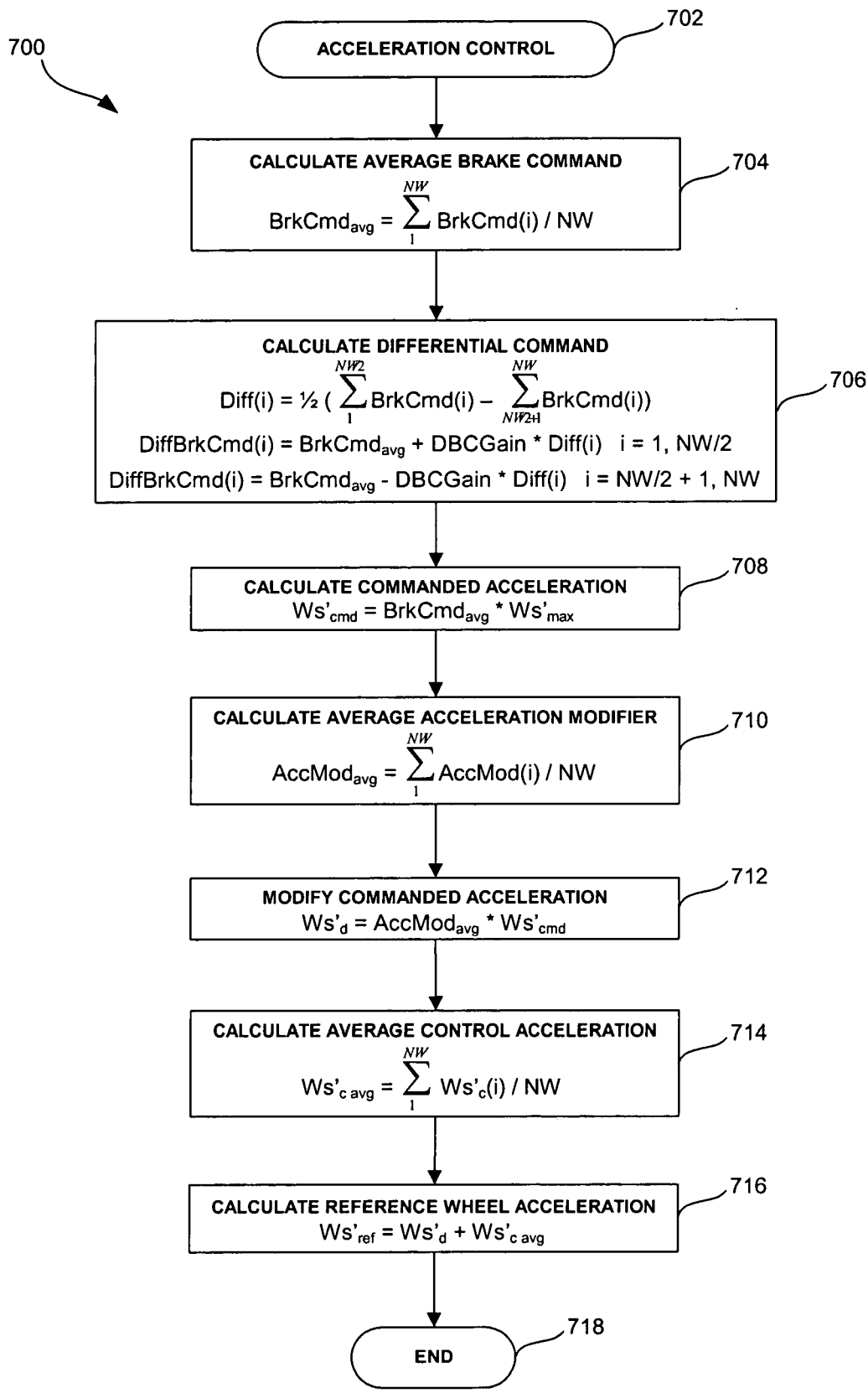
FIG. 7 is a flowchart generally illustrating the functionality associated with the acceleration controller according to the present invention.

An acceleration controller 108 is configured to receive information from Input Reader 106 and generate a desired acceleration 134 ($Ws'_d$), also referred to herein as desired deceleration, and a commanded acceleration 136 ($Ws'_{cmd}$), a differential brake command 130 (DiffBrkCmd) and a reference wheel acceleration 132 ($Ws'_{ref}$) for each wheel, as described herein with reference to FIG. 7. The acceleration controller 108 is configured to receive the BrkCmd 124 for each wheel generated by Input Reader 106, and the control acceleration 128 ($Ws'_c$) and acceleration modifier 126 (AccMod) for each wheel generated by a control monitor 114 as is described herein with reference to FIGS. 10–14.

The trajectory generator 110 is configured to receive the $Ws'_d$ 134 generated by the acceleration controller 108 and a DiffBrkCmd 130 and $Ws'_{ref}$ 132 for each wheel also generated by the acceleration controller 108. In addition, the trajectory generator 110 is further configured to receive from Input Reader 106 a Ws 118 and BrkCmd 124 for each wheel. Optionally, the trajectory generator 110 is also configured to receive a wheel speed ratio 148 ($Ws_{ratio}$) from an optional tire radii compensator 116. The $Ws_{ratio}$ 148 are used to compensate for differences in wheel radii due to wear, tire pressure, etc. The generation of $Ws_{ratio}$ 148 by the tire radii compensator 116 is discussed herein with reference to FIG. 6.

From the received inputs, the trajectory generator 110 is configured to generate for each wheel a wheel speed error 138 ($Ws_{err}$), a wheel acceleration error 142 ($Ws'_{err}$), a wheel reference speed 140 ($Ws_{ref}$), and a slip ratio set point 144 (SlipPt). The specific functionality associated with such generation and the relationships among the generated outputs are described herein with reference to FIG. 8.

The system 100 includes a Proportional/Integral/Derivative (PID) controller 112 for each wheel. As shown, each of the PID controllers 112 is configured to receive and generate information related to the control of a single wheel. The PID controllers 112 are each configured to receive the Ws 118 from the Input Reader 106, as well as the $Ws_{err}$ 138, $Ws'_{err}$ 142 and $Ws_{ref}$ 140 from the trajectory generator 110. From the received inputs, the PID controller 112 generates an output pressure signal 150 (Pout) representing the amount of pressure to be applied to the wheel to control braking and a slip velocity 146 ($Ws_{slip}$). The generation of the PID controller 112 outputs are discussed herein with reference to FIGS. 9A–C.

The system 100 also includes a control monitor 114 for each wheel that is configured to receive the $Ws_{slip}$ 146 from the PID Controller 112; the $Ws_{err}$ 138, $Ws_{ref}$ 140, and SlipPt 144 from the trajectory generator 110; and the $Ws'_{cmd}$ 136 from the acceleration controller 108. From these received inputs, the control monitor 114 generates a control acceleration 128 ($Ws'_c$) and an acceleration modifier 126 (AccMod), which are used by the acceleration controller 108 as described herein with reference to FIG. 7. The specific functionality of the control monitor 114 is described in detail herein with reference to FIGS. 10–14, and the generation of the AccMod 126 is described in detail with reference to FIGS. 12A–B.

In addition, one embodiment of the brake control system 100 also includes an optional tire radii compensator 116 for calculating differences, if any, between the radii of the wheels, which are generally caused by differences in radii of the tires. Such differences can be used to further refine the calculations of the trajectory generator 110. As shown, the tire radii compensator 116 is configured to accept left and right Ws 118, as well as left and right wheel control parameters 118. This information is used to generate left and right wheel ratios 148, as described herein with reference to FIG. 6.

It will be understood that a system containing the elements of the brake control system 100 can be embodied in either hardware, software, of a combination of hardware and software. Furthermore, each of the Input Reader 106, acceleration controller 108, the trajectory generator 110, the PID controller 112, the control monitor 114, and the tire radii compensator 116 are to be considered functional components and not limited to the specific configuration disclosed in FIG. 1. It is within the scope of the present invention to combine functional components or separate functional components into additional subcomponents. For example, the tire radii compensator 112 and trajectory generator 108 can be combined into a single component, or the trajectory generator 108 can be split into multiple trajectory generators 108, one for each wheel.

Each of the functional components of FIG. 1 can be embodied in one or multiple programmable logic controllers ("PLC"); PC-based logic controllers ("PCLC"); one or more microprocessors; a computer or computing system having control software, or the like; and combinations thereof. In addition, more than one of the functional components can exist on a single PLC or the like. The hardware/software in which at least one of the functional components is embodied could be capable of controlling simultaneous tasks, could support fieldbus I/O, and could utilize solid state storage, such as Compact FLASH storage media. It will also be appreciated by those skilled in the art that each aircraft in which the brake control system is implemented will have different characteristics and control requirements, and that the specific configuration and settings associated with the functional components may be machine-dependent.

Turning now to FIG. 2, a plot of deceleration trajectories for various autobrake settings is provided. As shown, the plot illustrates the differences between autobrake settings 104 of: MIN, MEDIUM, MAX, and RTO, although it will be understood that additional settings may exist. The autobrake setting 104 determines the trajectory of the wheel reference speed $Ws_{ref}$ 140, which is represented by the solid line. The autobrake setting 104 also sets the amount of slip for generating the wheel speed set point ($Ws_{sp}$), which is represented by the dotted line. With reference to FIG. 1, the slope of the $Ws_{ref}$ 140 trajectory is the $Ws'_{cmd}$ 136 and the slope of the dotted line is the wheel acceleration set point ($Ws_{sp}$).

The autobrake settings 104 represent ideal trajectories that may be impossible to maintain due to surface conditions. For example, it may be impossible to utilize a MAX autobrake setting 104 on snow without locking or skidding. Therefore, the autobrake setting 104 sets what may be considered the initial $Ws_{sp}$. When the set trajectory cannot be maintained, new $Ws_{ref}$ 140 and $Ws_{sp}$ that can be maintained are generated. The new $Ws_{ref}$ 140 $Ws_{sp}$ are generated by the trajectory generator 110, as discussed herein with reference to FIG. 8.

Figure 3A:
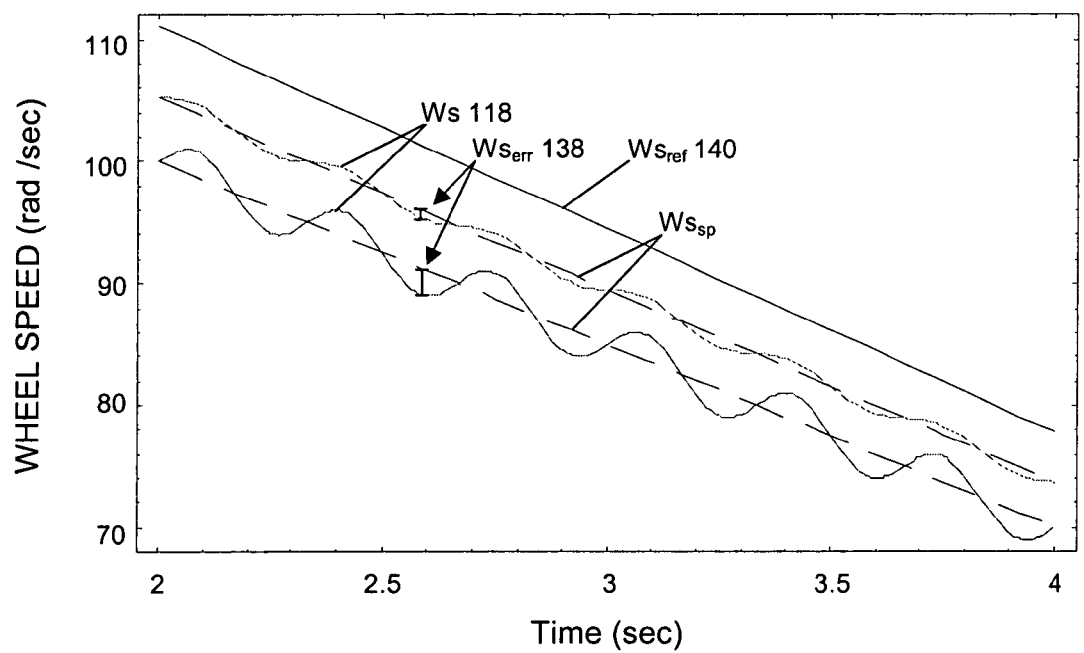
FIGS. 3A–C are plots of wheel speed versus time showing control oscillations and illustrating brake control functionality.

Turning now to FIGS. 3A–E, plots of wheel speed versus time showing control oscillations and illustrating brake control functionality are provided. Antiskid systems function to keep vehicles within appropriate stability limits. For example, as shown in FIG. 3A, Ws 118 should remain within a set range or band, which can be considered a normal operating range, when operating under normal conditions. However, the wheel speeds 118 can drop below the normal operating range for any number of reasons, such as: tire friction maximum drops, tire friction maximum location drops, brake friction rises, tire normal force drops, tire radius changes, or inadequate control. A drop in wheel speed 118 below the normal operating range is indicative of a control inadequacy. To correct the control inadequacy, the $Ws_{sp}$ can be raised. Raising the $Ws_{sp}$ can make the control adaptation self-correcting. Single or multiple corrections of varying sizes can be applied to the $Ws_{sp}$ until the Ws 118 reenters its control band and normal control is reestablished.

Most control systems will oscillate about a $Ws_{sp}$. The amplitude and frequency of the oscillation is dependant on the device being controlled and the device doing the controlling. For a brake control system, the magnitudes of the transients depend on: sensor noise, mechanical oscillations (gear walk, tire torsional and fore aft vibrations, etc.), speed of the brake, and speed of the control loops.

FIG. 3A shows the $Ws_{ref}$ 140 and multiple $Ws_{sp}$ in dashed black for both medium slip and high slip. The two dashed lines might represent, for example, trajectories associated with MIN and MED autobrake settings 104. The difference between the Ws 118 and the $Ws_{sp}$ is the $Ws_{err}$ 138.

Figure 3B:
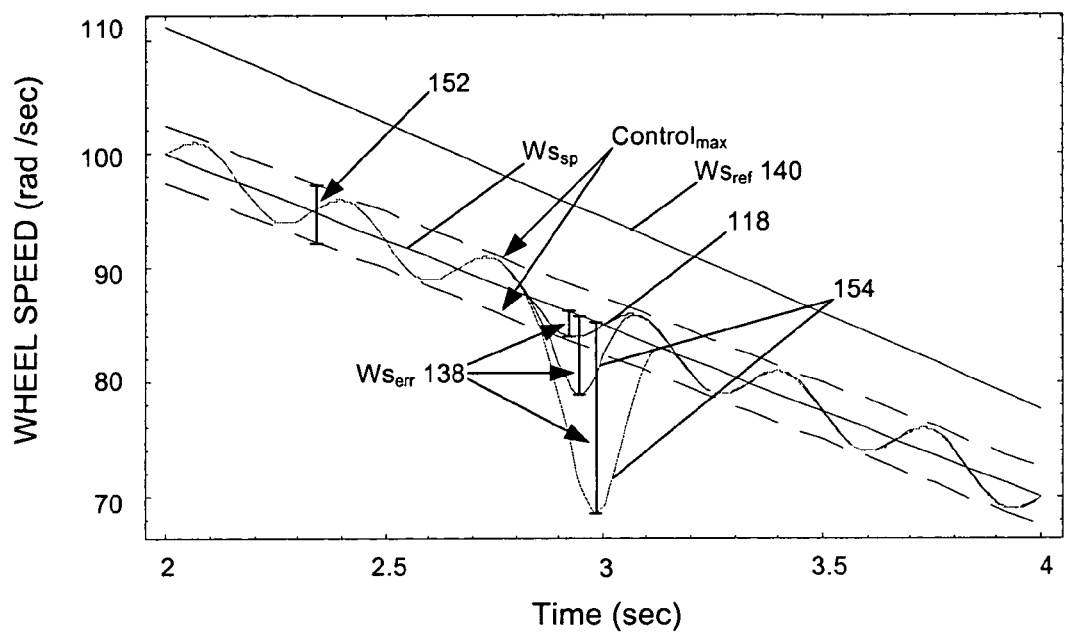

As shown in FIG. 3B, the Ws 118 oscillates within a steady state control band 152 which is the range between the upper and lower maximum control tolerances ($Control_{max}$). For normal brake operation, the oscillations 154 are about ½ rad/sec. As the tire slip moves up the mu-slip curve, pressure variation results in more change in wheel speed 118 than in vehicle speed. When a tire goes past the peak of the mu-slip curve, as shown by excursions 154, the control loop takes time to respond and the excursions will increase. Generally, a good brake control system will keep the Ws 118 within the steady state control band 152. The steady state control band 152 may have a standard deviation of about 2.5 rad/sec or less. The range of the steady state control band 152 is provided for exemplary purposes only and is not intended to limit the disclosure or claims of the present invention. Excursions 154 greater than steady state control band 152 are most likely due to operation on the wrong side of the tire mu-slip curve. If tire friction has decreased, the amplitude of the decreased friction excursion 154 will further increase and the time required to return to normal operation will also increase.

When abnormal operation is identified (skid detected), which can happen when the Ws 118 drops below the $Control_{max}$ and falls outside of the steady state control band 152, $Ws_{ref}$ 140 is suitably increased, which results in an increase in the $Ws_{sp}$. A problem immediately apparent with identification of a skid by changes in Ws 118 alone is that noise on the Ws 118 signal may cause the system to erroneously detect a skid. To combat noise sensitivity, the $Ws_{err}$ 138 signal is integrated when the $Ws_{err}$ 138 is negative and its value is also used for skid identification.

Figure 3C:
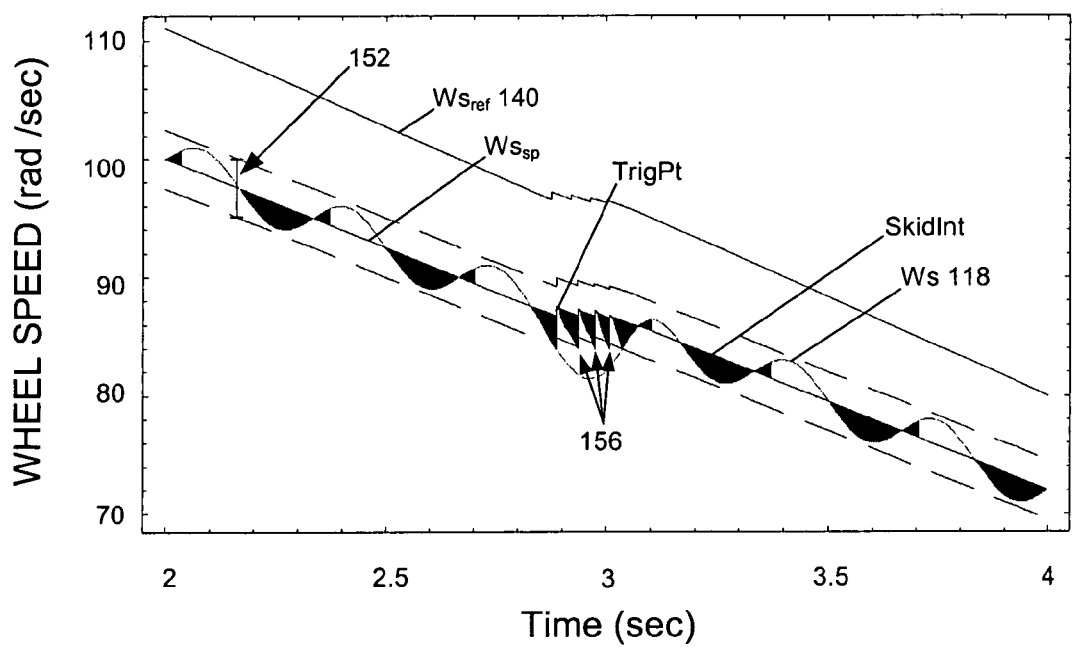

Turning now to FIG. 3C, the integration of the error signal is illustrated. Antiskid systems typically cycle at around five hertz. A limiting value on the integrator can be determined by precomputing the integrator value that is obtained when the wheel speed error reaches −2.5 rad/sec assuming a design value of a five Hz sinusoid. With this understanding, one can define a skid as occurring when the $Ws_{err}$ 138 is less than −2.5 rad/sec and the integral of a negative $Ws_{ref}$ 138 is beyond a calculated trigger point (TrigPt). This determination method is insensitive to noise. It should be noted that if the $Ws_{ref}$ 138 enters into a skid more abruptly than a five Hz sinusoid, the integrator will fill up faster and trigger a skid faster. Identification of a skid results in three events: the negative skid integrator (SkidInt) is decremented, the $Ws_{ref}$ 140 is increased, and the subsequent deceleration of $Ws_{ref}$ 140 is momentarily reduced. These events will be described in detail below with reference to FIGS. 11–12B.

As shown, the SkidInt is turned on when $Ws_{err}$ 138 is negative. If a skid is identified by the wheel speed error being less than −2.5 rad/sec and the negative skid error integrator being less than the calculated trigger point a skid is identified and the integrator is decremented by the TrigPt. The decrementing process will continue to occur as SkidInt reaches its limit 156 and is discharged. A counter is incremented each time the SkidInt is decremented for use as will be explained with reference to FIG. 11. Finally, the SkidInt is turned off when $Ws_{err}$ 138 is positive and SkidInt has reached a precomputed value. Requiring SkidInt to reach a precomputed value avoids having the integration cycle end prematurely due to noise on $Ws_{err}$ 138. A value of 40 percent of TrigPt has been found to work well for the precomputed value.

Each time the SkidInt is reset, the $Ws_{ref}$ 140 is increased. The present invention utilizes an increase of about 0.3%, although other values may be utilized. If one increased $Ws_{ref}$ 140 by 0.3% at each reset in the series, $Ws_{ref}$ 140 could grow without bound during long, deep skids. To avoid such growth, a convergent mathematical series can be utilized. For example, the mathematical summation series $$f[n] = \sum_{1}^{\infty} 1/n^p = 1 + 1/2^p + 1/3^p \ldots \quad (1)$$

is convergent for values of p greater than one. So rather than add 0.3% at each reset, one can add $0.3\%/n^p$ where n is the number of skid integrator resets. For example, if p were one, the first three increases would be 0.3, 0.15, and 0.1. For convergence however, the exponent p should be greater than one. Setting p equal to 1.01 provides an acceptable value. It should be obvious to those skilled in the art that 0.3%, p=1.01, and the series chosen are exemplary and should not be interpreted to limit the scope of the present invention. In addition, the 0.3% gain is a maximum value only applied when the pedals are fully depressed. Proportionately less gain is applied for lower pedal applications. For example at half pedal application, the first skid indication might cause an increase of 0.15% in $Ws_{ref}$ 140.

In the equations above, and in the figures and equations below, an index "i" is used to indicate a specific wheel such as left or right and to indicate array indexing. The subscript "k" is used to indicate data from the last cycle and the subscript "j" represents the negative going set point crossings. The i index is omitted when it is clear the function operates on only one wheel and the k subscript is omitted where it is clear that data from the current cycle is being used. In addition, the subscript "n" is used to represent a number of triggers, "NW" is used to represent the number of braked wheels, and "dt" represents the computational cycle.

Figure 3D:
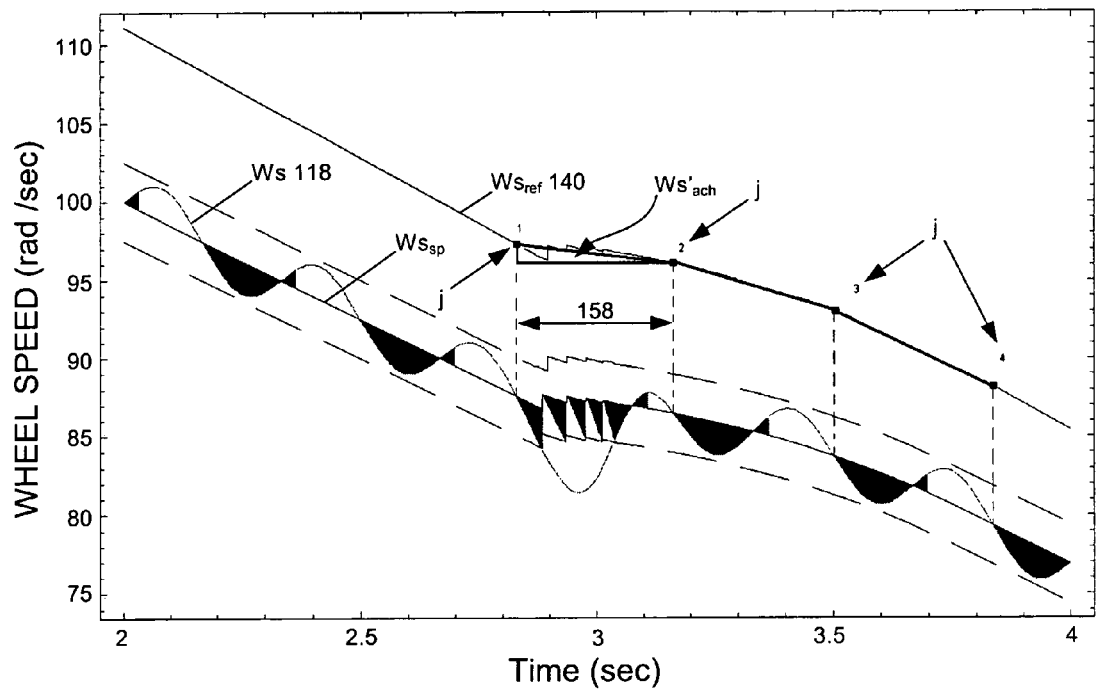
FIGS. 3D–E are plots of wheel speed versus time illustrating the calculation of the acceleration modifier according to the present invention.
Figure 3E:
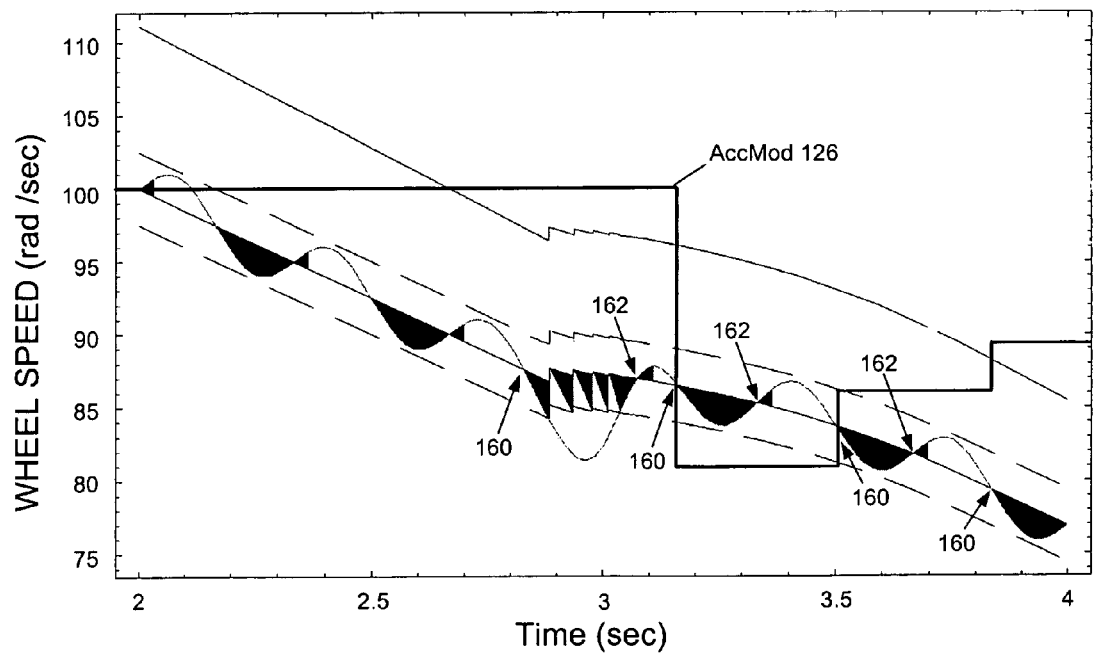

Turning now to FIGS. 3D–E, the calculation of AccMod 126 is illustrated. AccMod 126 is calculated based upon the deceleration achieved by the $Ws_{ref}$ 140 in the previous antiskid cycle 158. The antiskid cycle 158 is defined as the time between negative going set point crossings 160, which means that the antiskid cycle lasts from the time the Ws 118 drops below the $Ws_{sp}$ until the next time the Ws 118 drops below the $Ws_{sp}$. A few of these points j are illustrated in FIG. 3D as points 1, 2, 3 and 4. Between time 1 and 2, the $Ws_{ref}$ 140 has been increased by the Control Monitor 114. At time 1, the $Ws_{ref}$ 140 is stored, and at time 2 the achieved wheel reference speed deceleration ($Ws'_{ach}$) during the antiskid cycle 158 is calculated as the difference in $Ws_{ref}$ over time:

$$Ws'_{ach} = (Ws_{ref}(2) - Ws_{ref}(1))/(t(2) - t(1)) \quad (2)$$

The achieved deceleration is normalized by the commanded deceleration, yielding a normalized achieved deceleration ($NWs'_{ach}$):

$$NWs'_{ach} = -Ws'_{ach}/Ws'_{cmd} \quad (3)$$

The NWs'$_{ach}$ is a number between zero and one. After being reduced, NWs'$_{ach}$ is driven toward one by taking a weighted average of the current value with the maximum value where the maximum value is one. For example, a raw acceleration modifier (RawAccMod) can be calculated as:

$$RawAccMod=0.25+(1.0-0.25)*NWs'_{ach} \quad (4)$$

where 0.25 has been used as a exemplary value. For example, if NWs'$_{ach}$=0.5, RawAccMod is 0.625.

The final acceleration modifier AccMod 126 is computed by applying a low pass filter to the raw value. For example, AccMod 126 can be calculated as:

$$AccMod_j=AccMod_{j-1}+0.5*(RawAccMod-AccMod_{j-1}) \quad (5)$$

where the low pass filter constant of 0.5 is an exemplary value. It should be noted that the acceleration modifier calculation occurs at the antiskid cycling rate. For example, if the old AccMod 126 is one and the RawAccMod is 0.625, the new AccMod 126 at the next negative going set point crossing 160 is 0.8125. As shown in FIG. 3E, the value of AccMod 126 changes only at negative going set point crossing 160.

While deceleration is being modified, such as by the acceleration controller 108, trajectory generator 110, and control monitor 114, control laws are also being executed by the PID controller 112. A conventional PID control law provides a command according to the following formula:

$$Command=P+I+D \quad (6)$$

A brake system has a several variables that govern speed of response, such as: aircraft velocity, peak tire friction, tire friction peak location, brake friction, normal force, tire radius, brake friction, and wheel and tire inertia. Each of these variables can vary by up to about ten to one. Therefore, PID gains that work well at one set of conditions may be woefully inadequate for another. According to the present invention, the influence of varying factors is mitigated by reforming the control law as:

$$Command=P*I*D \quad (7)$$

The proportional term (P) is one until the maximum desired slip ratio is achieved and is then reduced until zero when the wheel is locked. The derivative term is one until the set point is crossed in either direction.

Figure 3F:
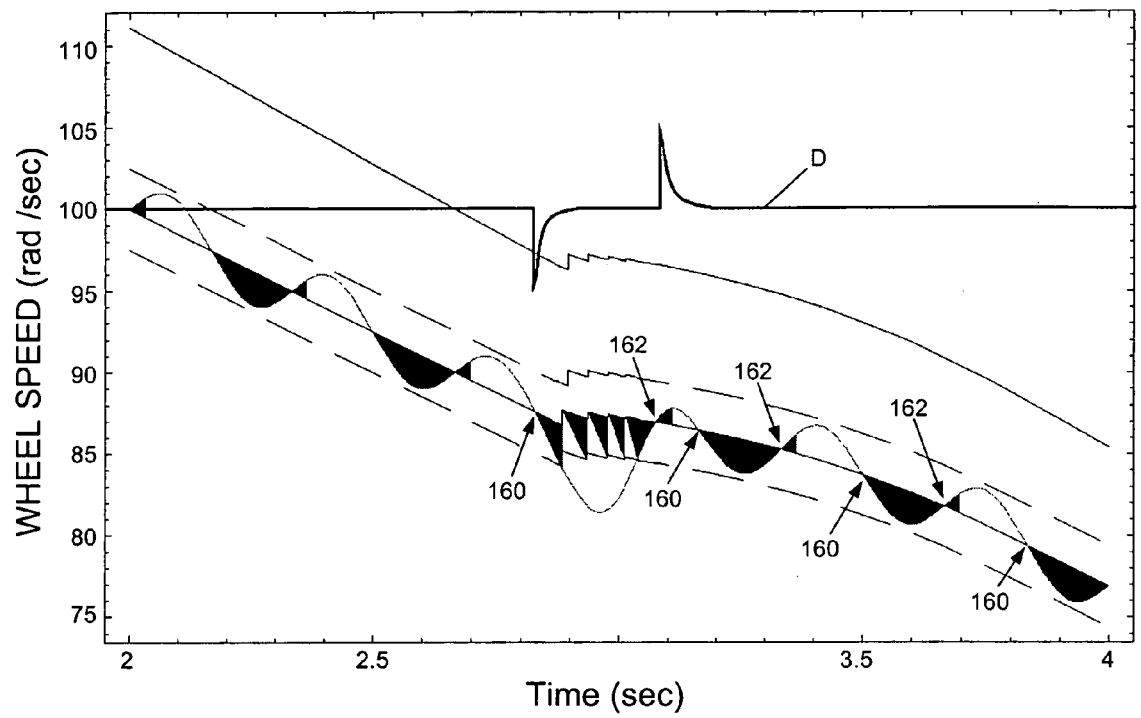
FIG. 3F is a plot of the derivative term versus time.

Referring now to FIG. 3F, the derivative term (D) is decreased about 5% on negative going set point crossings 160 and increased about 5% on positive going set point crossings 162. In addition, a derivative multiplier then decays toward one with a bandwidth that matches the brake to avoid overshoot. It should be obvious that the trigger points and reset values are nominal values and can be adjusted up or down as desired. To avoid susceptibility to noise and harmonic content, set point crossings preferably do not trigger a derivative term spike unless the Ws' exceeds a predetermined threshold value when the Ws 118 traverse the Ws$_{sp}$. To avoid susceptibility to a specific frequency, a negative derivative term spike will preferably not occur unless the derivative term is greater than 0.99 and a positive derivative term spike will not occur unless the derivative term is less 1.01.

In a conventional PID controller, both the proportional and derivative terms are continuously responsive to Ws$_{err}$ 138 and hence digest any oscillations on Ws 118. In accordance with the present invention, the proportional and derivative terms of the PID controller 112 operate on a more limited basis: slip ratio greater than maximum and set point crossings. Limiting the proportional and derivative terms to such operation makes the PID controller 112 less sensitive to frequency content that might occur on Ws 118, e.g., gear walk, hub cap eccentricity, tire out of round, tire out of balance, etc.

The rate of integration of the PID controller 112 is dependent on several things: Ws$_{err}$ 138, sign of Ws$_{err}$ 138, wheel acceleration, and integration pressure. The PID controller 112 relies on integration pressure to set the integral gain based on the following observation: low tire friction, low tire normal force or high brake friction requires a low steady state pressure and slow absolute response rates.

By way of example, if one increased pressure for the lightest aircraft on a snowed runway at the same rate as for heaviest aircraft on the stickiest runway, it is likely that the system would quickly overshoot the ideal operating point. Therefore, if the vehicle is not in a skid, the recent history of Pout 150 can act as an indicator of how fast Pout 150 can be applied. By assigning high dynamic content control to the proportional and derivative terms, the integral pressure can be varied relatively slowly, which enables its use in setting integral gain.

Brake control, antiskid and autobrake algorithm design are more reliable if the tire radii are known. Antiskid operation depends on operating at a given percent of vehicle speed and autobrake operation requires that a desired vehicle deceleration be converted to a desired synchronous wheel deceleration. If an independent source of vehicle velocity is not available, a nominal tire radius is generally assumed. Even if an independent source were available, questions arise as to accuracy, time delay, and fault tolerance.

Figure 3G:
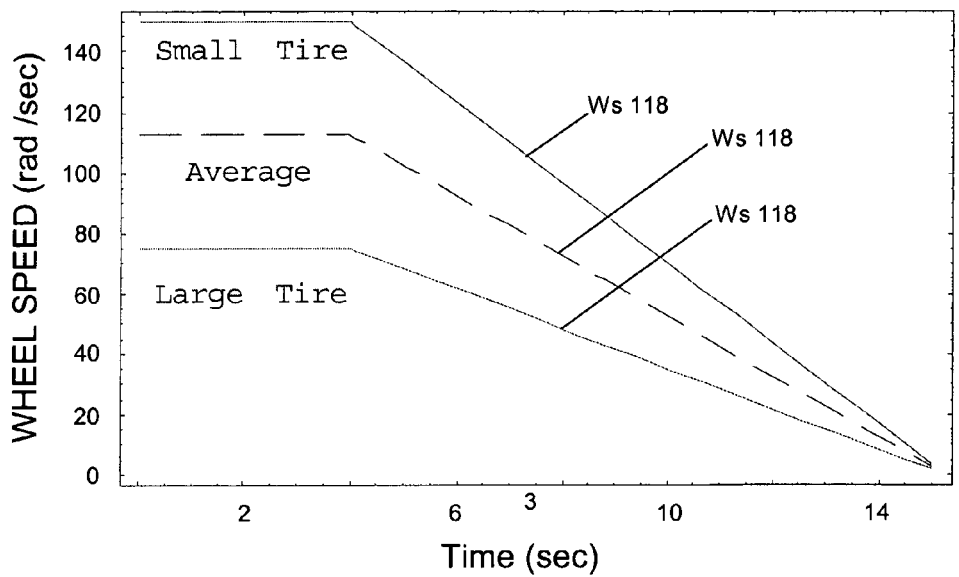
FIG. 3G is a plot of measured wheel speeds when the tire radius differs to illustrate the functionality of the tire radii compensator.

Referring now to FIG. 3G, three tire speeds are speed are shown. One tire is nominal and shown with a dashed line. One tire has a tire radius that is an exemplary twenty five percent above nominal and the other tire is twenty five percent below nominal. The tire with the smaller radius must spin faster than the one with the larger radius to cover the same ground during the stop. As illustrated, wheel reference velocity 140 and the deceleration are related to the nominal value by similar triangles.

Therefore, an optional tire radii compensator 116 can be used to compensate for tire radii differences. The antiskid and autobrake algorithms are dependent on tire radius because the desired deceleration rate is calculated based upon a nominal tire radius and the initial wheel speed is decelerated at this rate. If the true tire radius is the same as the assumed nominal tire radius, the vehicle will decelerate at the desired rate. If all the wheel radii are half of nominal, for example, it would appear to the control algorithm that the vehicle deceleration is twice the desired deceleration rate. Accordingly, the control algorithm would cause the brake pressure to be reduced by one half, causing the vehicle to decelerate at one half the desired rate. Furthermore, optional independent means for measuring vehicle speed can be used to ensure that the vehicle decelerates at the desired rate. Such means can be any method of measuring vehicle speed.

The optional tire radii compensator 116 compensates for the potential control system problem that occurs when one tire is smaller than the other(s). This discrepancy in tire size could be due to wear or under inflation for example. If not accounted for, the smaller tire will appear to have a higher deceleration. Failure to account to wheel radii discrepancies can cause vehicle deceleration to be less than desired. In addition, less energy may be dissipated in brake corresponding to the wheels with smaller radii than in brakes corresponding to wheels with larger radii, which can cause the vehicle to pull to one side or in the direction of the largest wheel.

Therefore, in one embodiment, a tire radii compensator 116 compensates for differences in wheel radii by looking at the difference in Ws 118 when the tires are spun up but prior to braking. The system control goal is to decelerate the average wheel speed by the desired value. Wheels that are above this average wheel speed are decelerated proportionately greater than wheels that are below this speed.

Having generally described the system functionality, the brake control system 100 will be described in detail with reference to its functional components.

Figure 4:
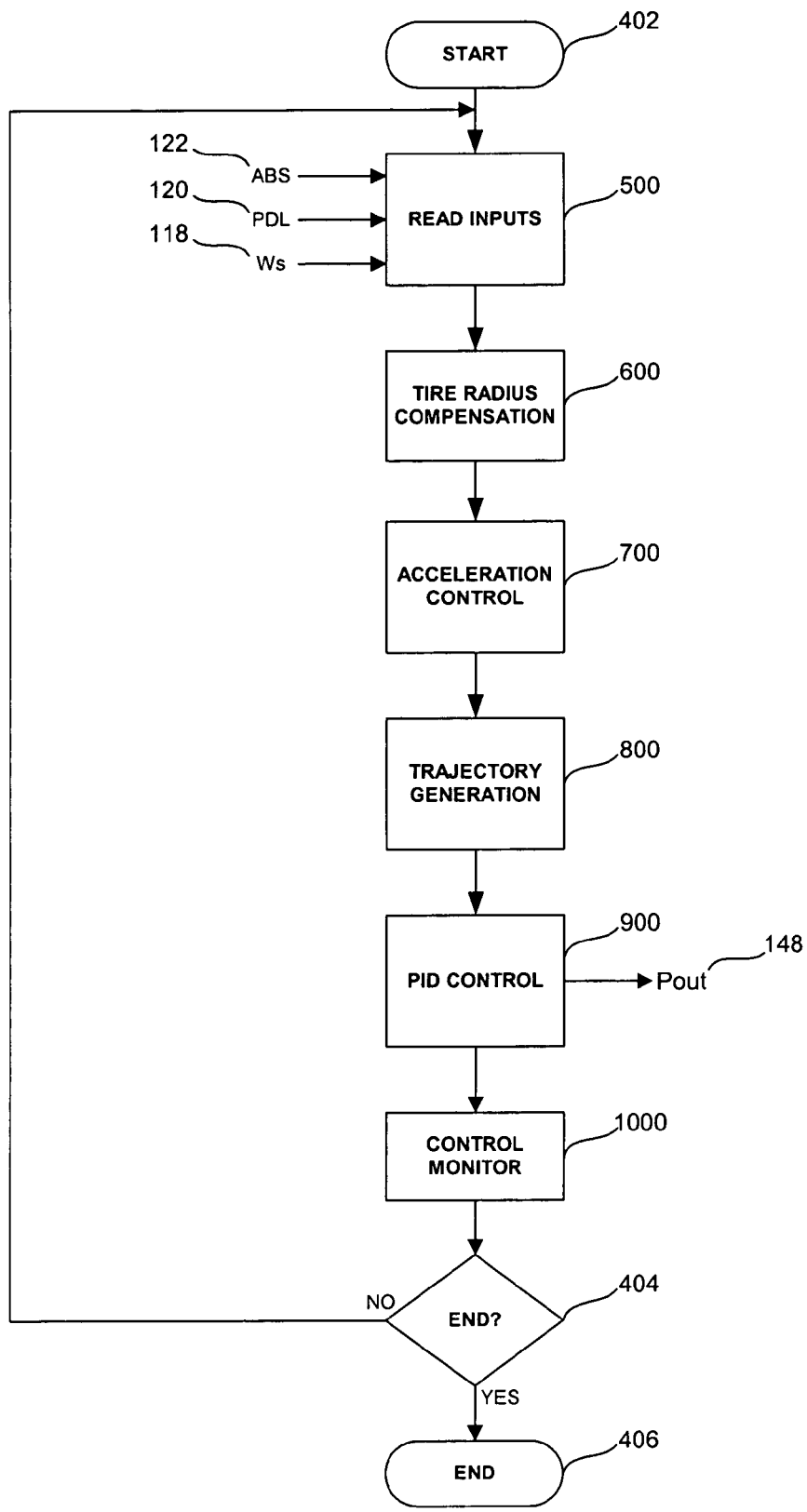
FIG. 4 is a flowchart generally illustrating the functionality of a brake control system according to the present invention.

Turning to FIG. 4, a flowchart generally illustrating the functionality of a brake control system 100 according to the present invention is provided. The specific functionality of the process blocks of FIG. 4 is described in FIGS. 5–14. The basic flow commences at start block 402, from which information flows to process block 500 wherein the system inputs are read. This functionality is associated with Input Reader 106 and the system inputs include Ws 118, PDL 120, and ABS 122.

Progression continues to process block 600 wherein tire radii compensation is performed by the tire radii compensator 116. It will be understood that brake control systems such as brake control system 100 can function without tire radii compensation as described above. In such embodiments, progression flows directly from process block 500 to process block 700.

Progression then continues to process block 700 wherein acceleration control is performed by the acceleration controller 108. Flow continues to process block 800 wherein calculations are performed by the trajectory generator 110.

Flow then progresses to process block 900 wherein calculations are performed by the PID controller 112, which generates the system output Pout 150. Progression continues to process block 1000 wherein calculations are performed by the control monitor 114.

Flow then continues to decision block 404 wherein a determination is made whether the process has reached its conclusion. A negative determination causes flow to loop back to process block 500 and a positive determination causes flow to continue to termination block 406.

Figure 5:
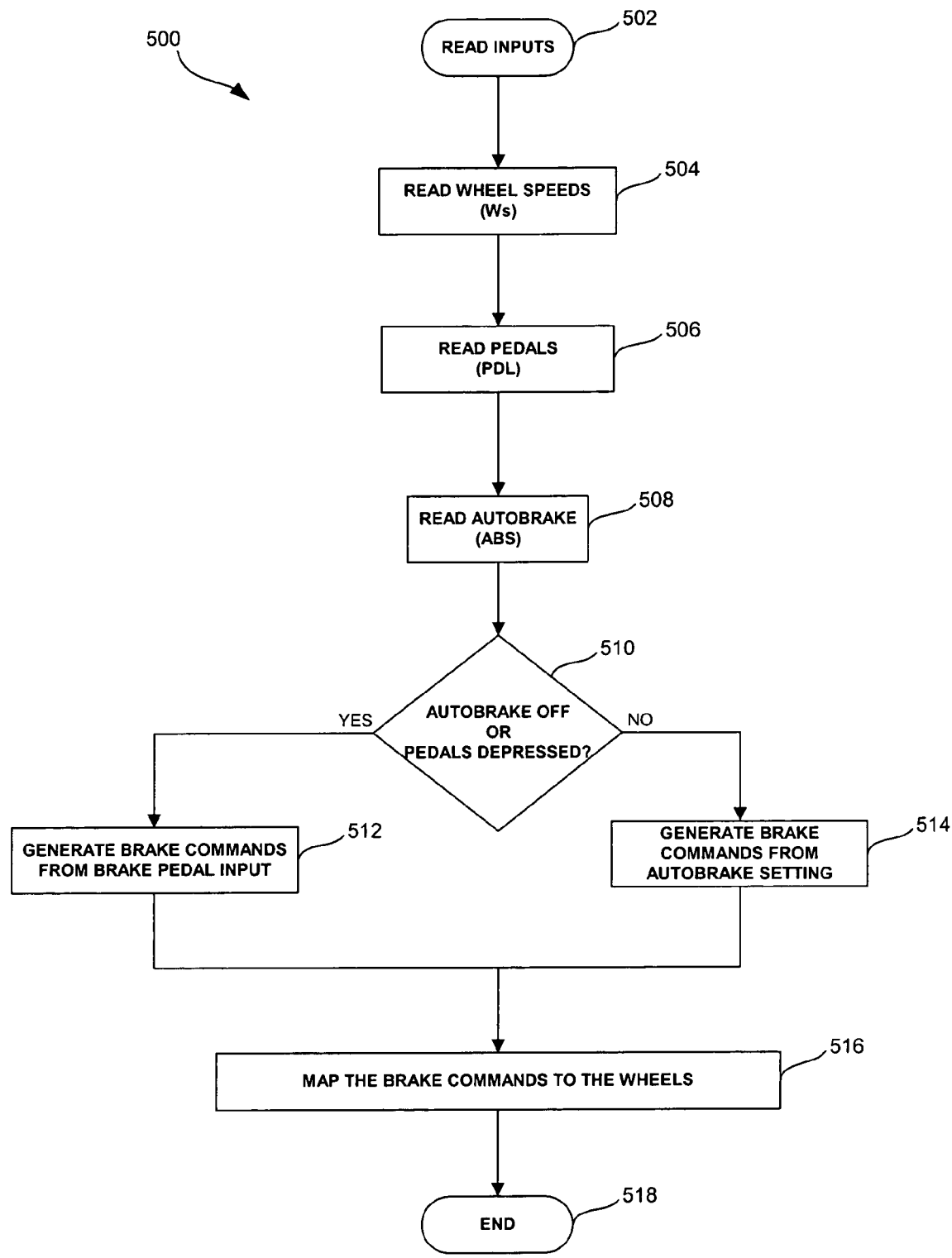
FIG. 5 is a flowchart generally illustrating the functionality associated with reading inputs and mapping commands to wheels of a vehicle according to the present invention.

Turning next to FIG. 5, a flowchart generally illustrating the functionality associated with Input Reader 106 is provided. Flow for process block 500 of FIG. 4 commences at start block 502, from which progress is made to process block 504, wherein each of the Ws 118 are read. The Ws 118 can be determined by any means known in the art, such as a sensor at the wheels. Progression then flows to process block 506 wherein each of the PDL 120 are read.

Flow then continues to decision block 508 wherein the ABS 122 is read. Progression then flows to decision block 510 wherein a determination is made whether either the autobrake system is OFF or if the brake pedals 102 are depressed. For example, the system may determine that a brake pedal 102 is depressed if the PDL 120 corresponds to a brake pedal 102 that is more than two percent depressed.

A positive determination at decision block 510 causes progression to flow to process block 512 wherein the BrkCmd 124 are generated from at least the PDL 120 for each wheel. The BrkCmd 124 can be used to generate the desired slip ratio and desired deceleration. Flow then continues to process block 516 wherein the BrkCmd 124 for each wheel is mapped to the appropriate wheel.

A negative determination at decision block 510 causes progression to flow to process block 514 wherein the BrkCmd 124 are generated from at least the ABS 122 for each wheel. Flow then continues to process block 516 wherein the BrkCmd 124 for each wheel is mapped to the appropriate wheel. Progression then flows to termination block 518.

The PDL 120 and ABS 122 each range from zero to one. The PDL 120 can be adjusted to match brake pedal 102 sensitivity settings and the ABS 122 can be adjusted to match the autobrake settings 104. In one embodiment, range restrictions, rate limiting, and filtering are also applied either to the PDL 120 or the BrkCmd 124.

The BrkCmd 124 represent desired levels of deceleration on a scale from zero to one where one represents the maximum the vehicle is capable of. The primary sources of deceleration are due to braking and reverse thrust. The maximum deceleration from braking can be obtained from flight test data or can be pre-calculated as:

$$Ws'_{max\ brake} = -g(\mu_p/R_n)/[1+(c/b)\{1+(h/c)\mu_p\}] \tag{8}$$

where: $\mu_p$ is the peak friction anticipated between the tire and the runway, g is gravity, $R_n$ is the nominal tire rolling radius, h is the height of the center of mass of the vehicle, b is the distance from the center of mass to the nose wheel axle, and c is the distance from the center of mass to the main landing gear axle. If all the main axles are not on the same axis, the average distance can be used.

The maximum deceleration from reverse thrust can be obtained from test data or precalculated using:

$$Ws'_{max\ thrust} = (Fth/Wgt)*g/R_n) \tag{9}$$

where Fth is the maximum reverse thrust and Wgt is the minimum weight of the vehicle. The maximum deceleration of the vehicle is:

$$Ws'_{max} = Ws'_{max\ brake} + Ws'_{max\ thrust} \tag{10}$$

The BrkCmd 124 further represents desired levels slip ratio on a scale from zero to one where one represents the maximum the tire is capable of. The maximum slip ratio the tire can support is generally accepted to be ten percent. A precomputed value is used in the invention but the algorithm is insensitive to the actual value. Consider for example, if the invention uses a value of 10% while the actual value was 13% and the pedals are fully depressed. Since the wheel reference speed is decelerated at the maximum rate, a vehicle decelerating at less than the maximum rate will have the wheel reference speed and hence the wheel speed set point quickly reach the thirteen percent slip point. At this time, the provisions provided by the invention while increase the reference velocity such that the wheel speed set point stays at the maximum slip of thirteen percent.

If the autobrake is ON, the $Ws_{ref}$ 140 is commanded to change at a desired rate, such as listed in Table 1.

TABLE 1

| | | Autobrake/Antiskid Settings | |
|---|---|---|---|
| Pilot Request | Desired Vehicle Accel (ft/sec$^2$) | Commanded Accel (Ws'$_{cmd}$) (rad/sec$^2$) | Desired Slip Ratio |
| MIN | ⅛ * Maximum | ⅛ * Ws'$_{max}$ | ⅛ * Slip$_{max}$ |
| MED | ¼ * Maximum | ¼ * Ws'$_{max}$ | ¼ * Slip$_{max}$ |
| MAX | ½ * Maximum | ½ * Ws'$_{max}$ | ½ * Slip$_{max}$ |
| RTO | Maximum | Ws'$_{max}$ | Slip$_{max}$ |

TABLE 1-continued

| | | Autobrake/Antiskid Settings | |
|---|---|---|---|
| Pilot Request | Desired Vehicle Accel (ft/sec$^2$) | Commanded Accel (Ws'$_{cmd}$) (rad/sec$^2$) | Desired Slip Ratio |
| Pedal | ½ * (PDL$_L$ + PDL$_R$) | ½ * (PDL$_L$ + PDL$_R$) * Ws'$_{max}$ | ½ * (PDL$_L$ + PDL$_R$) ± ½ * DBCGain * (PDL$_L$ − PDL$_R$) * Slip$_{max}$ |

As shown in Table 1, the pilot may select four levels of braking. It will be appreciated that Table 1 contains exemplary information, that additional autobrake settings may exist, and that the values associated with such settings are not intended to limit the scope of the present invention. As shown, the settings differ by a factor of two.

If a pilot wants to control the braking, the average pedal positions are scaled to represent from zero to maximum braking and the individual slip ratio set points are scaled to from 0 to ten percent. In this manner, differential braking is allowed. For example, if one pedal is fully depressed and one is not, only half of the vehicles' maximum deceleration can be maintained but full slippage is commanded on the braked wheel.

Figure 6:
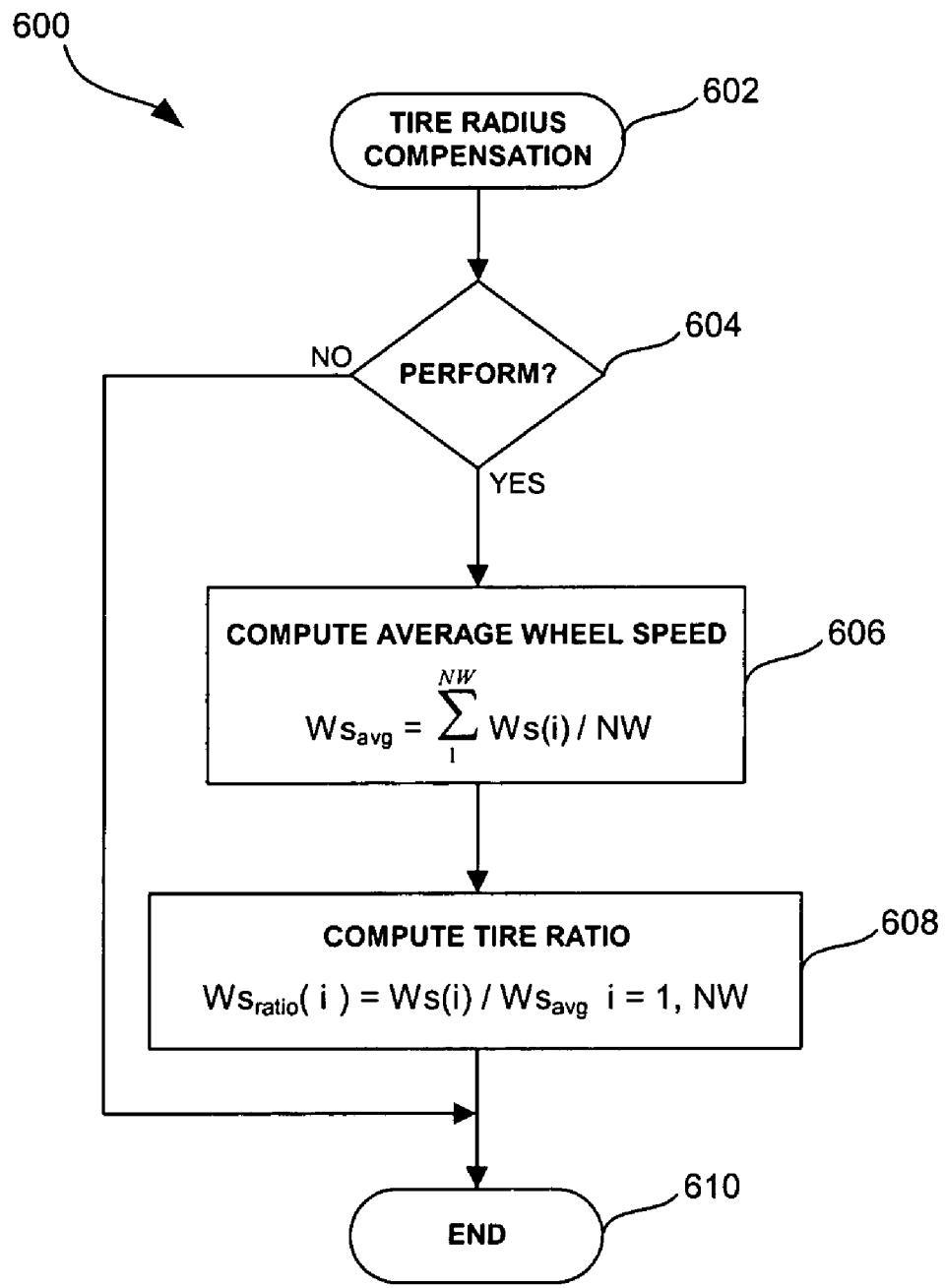
FIG. 6 is a flowchart generally illustrating the functionality associated with compensating for varying tire radii according to the present invention.

Turning now to FIG. 6, a flowchart generally illustrating the functionality associated with the tire radii compensator 116 is provided. Flow for process block 600 of FIG. 4 commences at start block 602, from which progress is made to decision block 604, wherein a determination is made whether tire radius compensation is to be performed. A negative determination causes progression to termination block 610.

A positive determination at decision block 604 causes progression to process block 606, wherein average wheel speed (Ws$_{avg}$) is computed. The Ws$_{avg}$ and can be calculated as:

$$W_{S_{avg}} = \sum_1^{NW} W_{S_{(i)}} / NW \tag{11}$$

Progression then continues to process block 608 wherein the wheel ratio (Ws$_{ratio}$) 148 is computed for each wheel, after which flow continues to termination block 610. The Ws$_{ratio}$ 148 can be computed as:

$$Ws_{ratio}(i) = Ws(i)/Ws_{avg} \; i=1, NW \tag{12}$$

Tire radius compensation takes place when the wheels are free rolling. Free rolling conditions include: command to actuators are zero, Ws 118 are within twenty percent of one other, and weight is on the wheels. In addition, the wheel ratio 148 is limited to about 0.7 to 1.1 based upon the range of tire ratios obtainable with over and under inflation. Also, the wheel radius compensation algorithm requires that differences in Ws 118 are attributable to wheel radius only, and not braking or turning. Therefore, the following conditions are preferable for wheel radius compensation: both Ws should be above a set minimum based upon a turning radius versus speed relationship; both brake stack pressures are zero; Ws 118 are increasing at no more than the rate that occurs during maximum forward thrust; slip ratio is less than 15%; and Ws 118 are within a predefined amount of one another.

Turning now to FIG. 7, a flowchart generally illustrating the functionality associated with the acceleration controller 108 is provided. Flow for process block 700 of FIG. 4 commences at start block 702, from which progress is made to process block 704, wherein the average brake command BrkCmd (BrkCmd$_{avg}$) is calculated as:

$$BrkCmd_{avg} = \sum_1^{NW} BrkCmd(i) - NW \tag{13}$$

Progression then continues to process block 706, wherein the DiffBrkCmd 130 are calculated. For the system of FIG. 1, the left and right DiffBrkCmd 130 can be calculated from the following equations:

$$Diff(i) = \frac{1}{2}\left(\sum_1^{NW2} BrkCmd(i) - \sum_{NW2+1}^{NW} BrkCmd(i)\right) \tag{14}$$

$$DiffBrkCmd(i) = BrkCmd_{avg} + DBCGain*Diff(i) \; i=1, NW/2 \tag{15}$$

$$DiffBrkCmd(i) = BrkCmd_{avg} - DBCGain*Diff(i) \; i=NW/2+1, NW \tag{16}$$

where DBCGain is a differential brake command gain constant. If the DBCGain is one, and both pedals are depressed equally, both of the DiffBrkCmd will equal the average brake command BrkCmd$_{avg}$. If the left pedal is fully depressed and the right not at all, the left wheels will have a BrkCmd 124 of one and the right zero. While the BrkCmd$_{avg}$ is used to set the deceleration of the Ws$_{ref}$ 140, the BrkCmd 124 are used to set the desired slip ratio and hence the Ws$_{sp}$. It may be the case that when one pedal 102 is fully depressed and the other released, the vehicle could veer to one side. Such veer allows a pilot to utilize the pedals 102 as a steering mechanism. Further, the DBCGain may be reduced, which in turn reduces steering authority. In aircraft, the relative authority of the rudder for directional control reduces at low speed as aerodynamic forces diminish. In this event, it may be desirable to have a low DBCGain at high speed and a higher DBCGain at speeds to balance steering authority during the course of a stop.

Flow then progresses to process block 708 wherein the commanded acceleration 136 (Ws'$_{cmd}$) is calculated. The Ws'$_{cmd}$ 136 can be calculated as:

$$Ws'_{cmd} = BrkCmd_{avg}*Ws'_{max} \tag{17}$$

where Ws'$_{max}$ is maximum acceleration.

Flow then continues to process block 710 wherein the average acceleration modifier (AccMod$_{avg}$) is calculated as:

$$AccMod_{avg} = \sum_{1}^{NW} AccMod(i)/NW \qquad (18)$$

Progression then continues to process block 712 wherein the commanded acceleration is modified by the average acceleration modifier to generate the desired wheel acceleration 134 (Ws'$_d$). The Ws'$_d$ 134 can be calculated as:

$$Ws'_d = AccMod_{avg} * Ws'_{cmd} \qquad (19)$$

Flow then continues to process block 714 wherein average control acceleration (Ws'$_{c\ avg}$) is calculated as:

$$Ws'_{c\,avg} = \sum_{1}^{NW} Ws'_c(i)/NW \qquad (20)$$

Progression then flows to process block 716 wherein the wheel reference acceleration 132 (Ws'$_{ref}$) is calculated, after which flow progresses to termination block 718. The Ws'$_{ref}$ 132 can be calculated as:

$$Ws'_{ref} = Ws'_d + Ws'_{c\,avg} \qquad (21)$$

Figure 8:
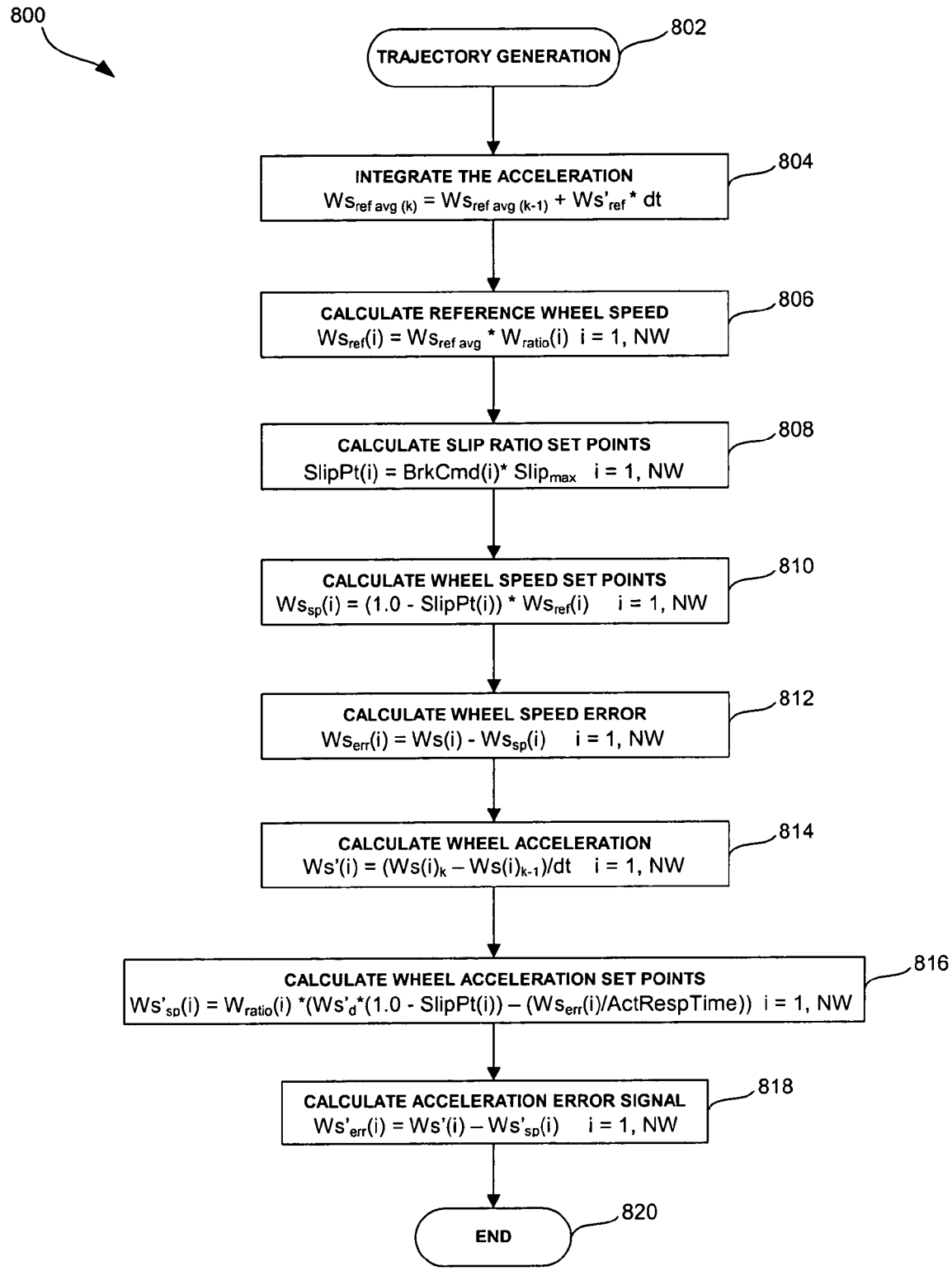
FIG. 8 is a flowchart generally illustrating the functionality associated with the trajectory generator according to the present invention.

Turning next to FIG. 8, a flowchart generally illustrating the functionality associated with the trajectory generator 110 is provided. Flow for process block 800 of FIG. 4 commences at start block 802, from which progress is made to process block 804, wherein the acceleration is integrated to calculate an average wheel reference speed (Ws$_{ref\,avg}$). The Ws$_{ref\,avg}$ can be calculated as:

$$Ws_{ref\,avg(k)} = Ws_{ref\,avg(k-1)} + Ws'_{ref}*dt \qquad (22)$$

Flow then progresses to process block 806 wherein each wheel's Ws$_{ref}$ 140 is calculated. The Ws$_{ref}$ 140 can be calculated as:

$$Ws_{ref}(i) = Ws_{ref\,avg} * Ws_{ratio}(i)\ i=1,\ NW \qquad (23)$$

Following calculation of Ws$_{ref}$ 140, progression continues to process block 808 wherein the slip ratio set points 144 (SlipPt) are calculated for each wheel. The SlipPt 144 can be calculated as:

$$SlipPt(i) = BrkCmd(i)*Slip_{max}\ i=1,\ NW \qquad (24)$$

where Slip$_{max}$ is the maximum slip ratio.

Progression then continues to process block 810, wherein the wheel speed set points (Ws$_{sp}$) are calculated for each wheel. The Ws$_{sp}$ can be calculated as:

$$Ws_{sp}(i) = (1.0 - SlipPt(i))*Ws_{ref}(i)\ i=1,\ NW \qquad (25)$$

Flow then continues to process block 812 wherein the wheel speed error signal 138 (Ws$_{err}$) is calculated for each wheel. The Ws$_{err}$ 138 can be calculated as:

$$Ws_{err}(i) = Ws(i) - Ws_{sp}(i)\ i=1,\ NW \qquad (26)$$

Progression then continues to process block 814 wherein the wheel acceleration (Ws') is calculated by differentiating the Ws. Wheel acceleration can be calculated as:

$$Ws'(i) = (Ws(i)_k - Ws(i)_{k-1})/dt\ i=1,\ NW \qquad (27)$$

Flow then continues to process block 816 wherein wheel acceleration set points (Ws'$_{sp}$) are calculated. The Ws'$_{sp}$ can be calculated as:

$$Ws'_{sp}(i) = Ws_{ratio}(i)*(Ws'_d*(1.0-SlipPt(i))-(Ws_{err}(i)/ActRespTime))\ i=1,\ NW \qquad (28)$$

where ActRespTime is actuator response time. The term with Ws'$_d$ 134 represents the steady state deceleration desired of the wheel. The Ws$_{err}$ divided by the ActRespTime represents the transient deceleration desired of the wheel. For example, if the unbraked wheel is turns at 100 radians/second and the pedals 102 are instantly pressed to full, the desired wheel speed set point is 90 radians per second assuming a maximum slip ratio of ten percent. The brake cannot respond instantly and the time that the brake takes to respond to the command is the ActRespTime. The acceleration the wheel can possibly obtain is 10 radians per second divided by the ActRespTime. Adding this term to the deceleration set point equation improves the response time of the brake control system of the present invention.

Progression then flows to process block 818 wherein the acceleration error signal 142 (Ws'$_{err}$) is calculated. The Ws'$_{err}$ 142 can be calculated as:

$$Ws'_{err}(i) = Ws'(i) - Ws'_{sp}(i)\ i=1,\ NW \qquad (29)$$

Following calculation of acceleration error, flow continues to termination block 820 wherein flow is terminated.

Figure 9A:
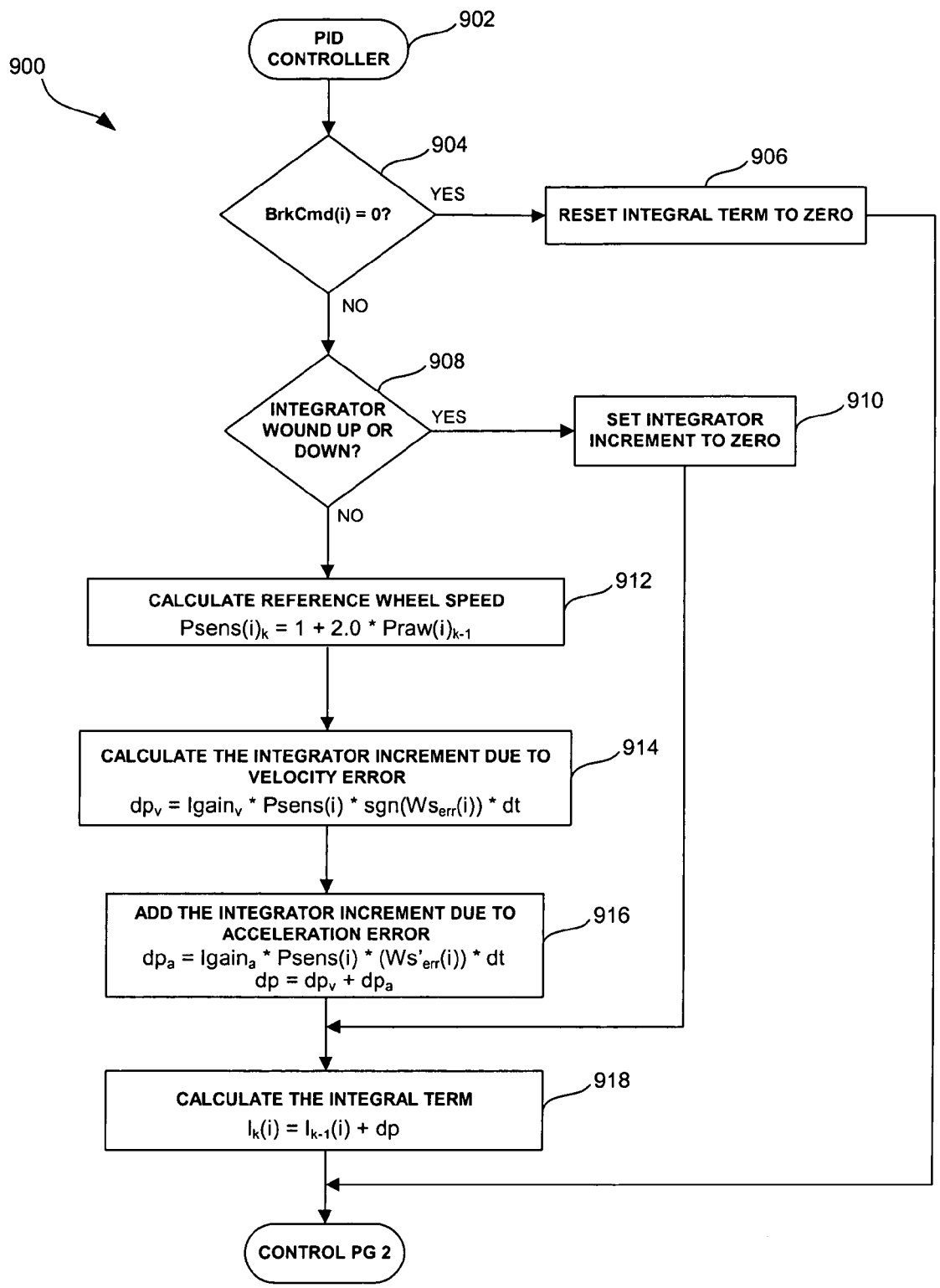
FIGS. 9A–B are flowcharts generally illustrating the functionality associated with the PID controller according to the present invention.
Figure 9B:
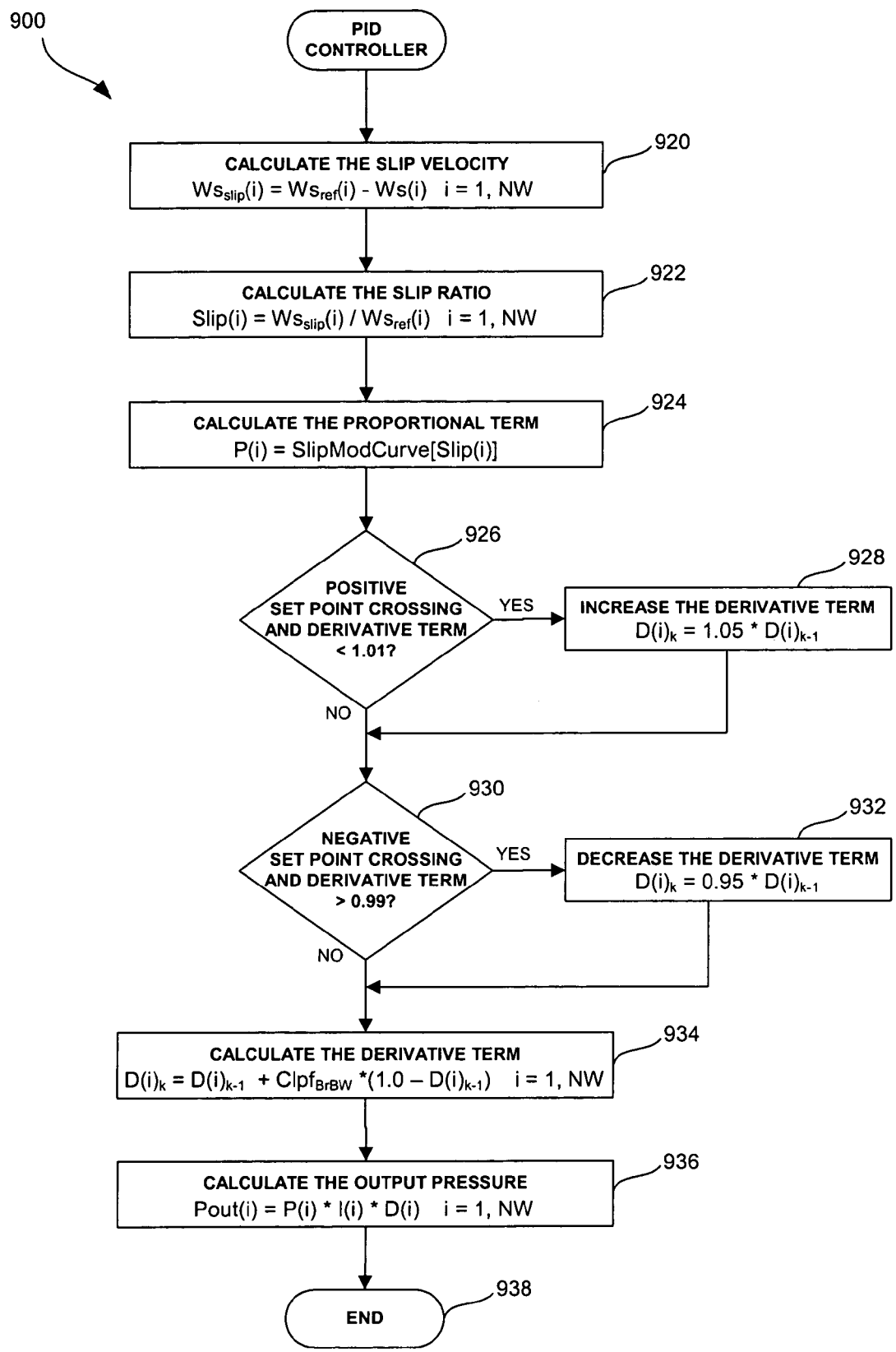

Turning now to FIGS. 9A–B, flowcharts generally illustrating the functionality associated with the PID controller 112. Flow for process block 900 of FIG. 4 commences at start block 902, from which progress is made to decision block 904, wherein a determination is made whether the BrkCmd 124 is equal to zero. A positive determination at decision block 904 causes progression to process block 906 wherein the integral term (I), also referred to herein as integrator, is reset to zero for each wheel. Progression then continues to process block 920 wherein slip velocity is calculated.

A negative determination at decision block 904 causes progression to decision block 908. At decision block 908, a determination is made whether the integrator is wound up or wound down. The integrator is wound up when it is equal to one and Ws$_{err}$ 138 is positive. The integrator is wound down when it is equal to one and Ws$_{err}$ 138 is negative. Integrator wind up can cause the brake control system 100 to require an excessively long time to return a desired operating value. Wind up can be avoided by monitoring the control loop output pressure signal (Pout) 150. Integration does not continue if the integrator is wound up or wound down.

A positive determination at decision block 908 causes progression to process block 910 wherein the integrator increment (dp) is set to zero. Progression then continues to process block 918 wherein the integral term (I) is calculated.

A negative determination at decision block 908 causes progression to process block 912 wherein pressure sensitivity (Psens) is calculated. In one embodiment, pressure sensitivity calculated as:

$$Psens(i)_k = 1 + 2.0*Praw(i)_{k-1} \qquad (30)$$

where Praw is raw pressure and the factor of 2.0 is a present gain factor that is vehicle-dependent.

Progression then continues to process block 914, wherein the integrator increment (dp$_v$) due to wheel speed error is calculated. The dp$_v$ can be calculated as:

$$dp_v = Igain_v * Psens(i)*sgn(Ws_{err}(i))*dt \qquad (31)$$

where $Igain_v$ is the integral gain for the wheel speed error. The $Igain_v$ typically ranges between zero and ten based upon vehicle size and may be determined by preflight simulation and flight test results.

Flow then continues to process block 916 wherein the integrator increment ($dp_a$) due to acceleration error is calculated and added to $dp_v$ to yield the integrator increment (dp). The $dp_a$ can be calculated as:

$$dp_a = Igain_a * Psens(i) * (Ws'_{err}(i)) * dt \quad (32)$$

where $Igain_a$ is the integral gain for the wheel acceleration error. The $Igain_a$ typically ranges between zero and ten based upon vehicle size and may be determined by preflight simulation and flight test results. It is of note that the acceleration error is used in the calculation of the integral term so that noise amplified by the differentiation of Ws 118 will be removed by the integration process. The total integral pressure change, dp can then be calculated as:

$$dp = dp_v + dp_a \quad (33)$$

Progression then continues to process block 918 wherein the integral term (I) is calculated. The integral term can be calculated as:

$$I(i)_k = I(i)_{k-1} + dp \quad (34)$$

Flow then continues to process block 920 wherein slip velocity 146 ($Ws_{slip}$) is calculated. The $Ws_{slip}$ 146 can be calculated as:

$$Ws_{slip}(i) = Ws_{ref}(i) - Ws(i) \quad i=1, NW \quad (35)$$

Progression then flows to process block 922 wherein the slip ratio (Slip) is calculated. The slip ratio can be calculated as:

$$Slip(i) = Ws_{slip}(i) / Ws_{ref}(i) \quad i=1, NW \quad (36)$$

Progression then continues to process block 924, wherein the proportional term (P) is calculated. The proportional term can be calculated as:

$$P(i) = SlipModCurve[Slip(i)] \quad (37)$$

where SlipModCurve is the proportional gain versus slip ratio.

Figure 9C:
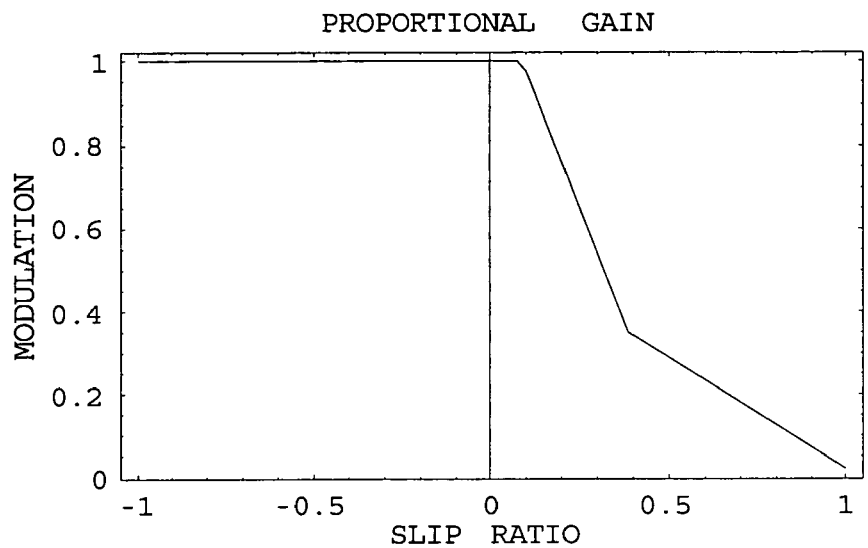
FIG. 9C illustrates an exemplary plot of modulation versus slip ratio for the proportional term according to the present invention.

FIG. 9C provides an exemplary plot of modulation versus slip ratio for the proportional term. As shown, the curve has a value of one until $Slip_{max}$, and then and drops to zero at the maximum slip ratio of 100%. It will be appreciated that the particular slip ratio plot will vary and may be determined by preflight simulation and flight test results.

Referring again to FIG. 9B, flow progresses from process block 924 to decision block 926 wherein a determination is made whether a positive set point crossing 162 has occurred and the derivative term (D) is less than 1.01. To avoid susceptibility to noise and harmonic content, set point crossings preferably do not trigger a derivative term spike unless the Ws' exceeds a predetermined threshold value when the Ws 118 traverse the $Ws_{sp}$. To avoid susceptibility to a specific frequency, a negative derivative term spike will preferably not occur unless the derivative term is greater than 0.99 and a positive derivative term spike will not occur unless the derivative term is less 1.01.

A positive determination at decision block 926 means that a positive set point crossing 162 has occurred, which causes progression to process block 928 wherein the derivative term is increased. According to one embodiment of the present invention, the derivative term is increased five percent with each positive set point crossing 162, although the specific amount of increase may vary. The derivative term can be increased according to the following equation:

$$D(i)_k = 1.05 * D(i)_{k-1} \quad (38)$$

Flow then continues to decision block 930.

A negative determination at decision block 926 causes progression to decision block 930 wherein a determination is made whether a negative set point crossing has occurred and the derivative term (D) is greater than 0.99. Again, a threshold is selected to help avoid susceptibility to noise and frequency content as discussed above with reference to decision block 926.

A positive determination at decision block 930 causes progression to process block 932 wherein the derivative term is decreased. According to one embodiment of the present invention, the derivative term is decreased five percent with each negative set point crossing, although the specific amount of increase may vary. The derivative term can be increased according to the following equation:

$$D(i)_k = 0.95 * D(i)_{k-1} \quad (39)$$

Flow then continues to process block 934.

A negative determination at decision block 930 causes progression to process block 934 wherein the derivative term (D) is calculated. In one embodiment, the derivative term is calculated as:

$$D(i)_k = D(i)_{k-1} + Clpf_{BrBW} * (1.0 - D(i)_{k-1}) \quad i=1, NW \quad (40)$$

where $Clpf_{BrBW}$ is a low pass filter constant matching the brake bandwidth. The above-described method of adding a derivative like term has advantages over conventional methods of differentiating the wheel speed error signal. For example, the above-described method provides a superior fast response without exciting gear walk. In addition, a conventional derivative term continually digests oscillations of the signal and has an output that is proportional to both the oscillation amplitude and frequency. The above-described method can be triggered at the gear walk frequency while maintaining an amplitude that is independent of the gear walk amplitude. In one embodiment, the derivative term has fixed duration and an amplitude that is not a function of frequency content.

It will be understood that the specific trigger for the derivative term is exemplary. It is often desirable to trigger the derivative term before crossing the set point when the tire is spinning back up. In such instances, for example, the invention could be modified to trigger 1 rad per second before the crossing.

Flow then continues to process block 936 wherein output pressure signal 150 (Pout) is calculated. The Pout 150 can be calculated as:

$$Pout(i) = P(i) * I(i) * D(i) \quad i=1, NW \quad (41)$$

Following calculation of Pout 150, progression continues to termination block 938 where flow is terminated. The proportional, integral, and derivative terms and Pout 150 each range from zero to one and are scaled appropriately by subsequent processes.

Figure 10:
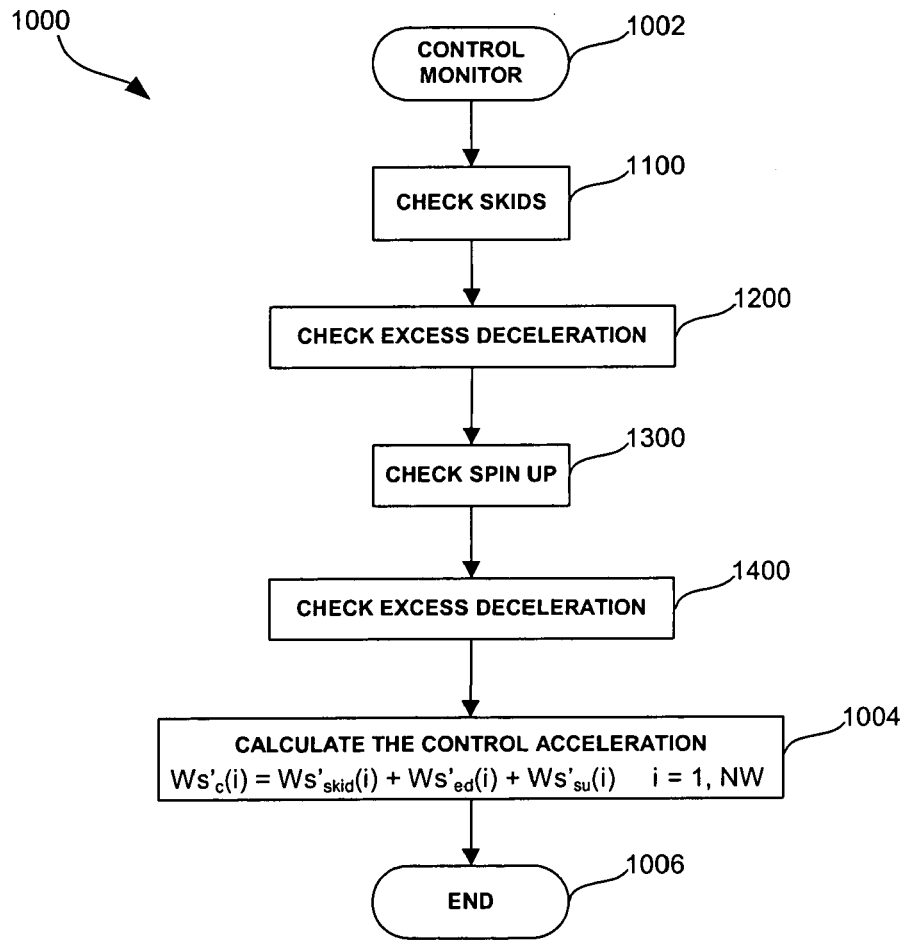
FIG. 10 is a flowchart generally illustrating the functionality associated with the control monitor according to the present invention.

Turning next to FIG. 10, a flowchart generally illustrating the functionality associated with the control monitor 114 is provided. Flow for process block 1000 of FIG. 4 commences at start block 1002, from which progress is made to process block 1100, wherein the system checks for skid conditions. Progression then continues to process block 1200, wherein the acceleration modifier 126 (AccMod) is calculated.

Flow then continues to process block 1300, wherein system checks for spin up conditions, after which progression continues to process block 1400, wherein system checks for excess deceleration conditions.

Progression then continues to process block 1004 wherein control acceleration 128 (Ws'$_c$) is calculated. The Ws'$_c$ 128 can be calculated as:

$$Ws'_c(i) = Ws'_{skid}(i) + Ws'_{ed}(i) + Ws'_{su}(i) \quad i=1, NW \quad (42)$$

where Ws'$_{skid}$ is skid cycle acceleration, Ws'$_{ed}$ is excess deceleration cycle acceleration, and Ws'$_{su}$ is spin up cycle acceleration. Progression then continues to termination block 1006 wherein flow is terminated.

Figure 11:
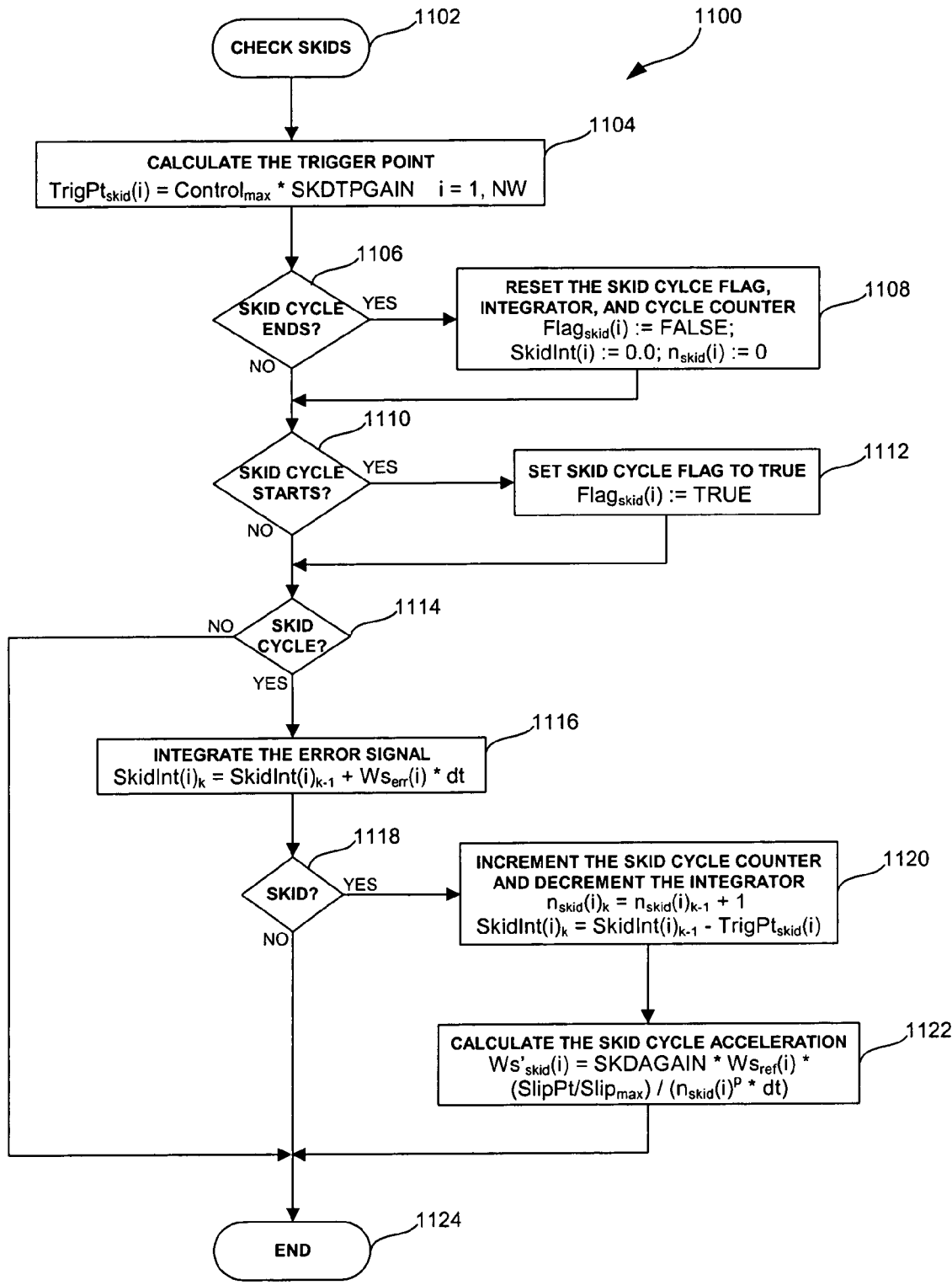
FIG. 11 is a flowchart generally illustrating the functionality associated with calculating skid cycle acceleration according to the present invention.

Turning next to FIG. 11, a flowchart generally illustrating the functionality associated with determining if a skid has occurred and calculating skid cycle acceleration is provided. A skid condition can generally be identified by: a slip ratio greater than Slip$_{max}$, the integral of negative wheel speed error is less than a predetermined value, and wheel speed below its set point by more than Control$_{max}$ where 2.5 rad/sec has been found to be a reasonable value.

Flow for process block 1100 of FIG. 10 commences at start block 1102, from which progress is made to process block 1104, wherein the skid trigger points (TrigPt$_{skid}$) are calculated. Trigger points can be calculated as:

$$\text{TrigPt}_{skid}(i) = \text{Control}_{max} * \text{SKDTPGAIN} \quad i=1, NW \quad (43)$$

where SKDPTGAIN is the constant that relates the skid cycle integral (SkidInt) to the amplitude and the frequency. The integrator trigger point can be determined by the integral of one quarter cycle of the negative error signal with an amplitude of Control$_{max}$ at the antiskid cycling frequency. As discussed, the antiskid cycling frequency may be approximately 5 Hz.

Progression then continues to decision block 1106, wherein a determination is made whether the skid cycle has ended. A skid cycle ends when the following conditions are met: the Ws$_{err}$ 138 is greater than zero, the SkidInt is greater than $-0.1*\text{TrigPt}_{skid}$, and the skid cycle flag (Flag$_{skid}$) is TRUE. A positive determination at decision block 1106 causes progression to process block 1108 wherein Flag$_{skid}$, SkidInt, and the skid cycle counter (n$_{skid}$) are all reset (Flag$_{skid}$(i):=FALSE, SkidInt(i):=0.0, and n$_{skid}$(i):=0). Progression then continues to decision block 1110.

A negative determination at decision block 1106 causes progression to decision block 1110. At decision block 1110, a determination is made whether a skid cycle has started. A skid cycle starts when the following conditions are met: the Ws$_{err}$ 138 is less than zero, and the Flag$_{skid}$(i) is FALSE. A positive determination at decision block 1110 causes progression to process block 1112 wherein the Flag$_{skid}$(i) is set to TRUE. Progression then continues to decision block 1114.

A negative determination at decision block 1110 causes progression to decision block 1114 wherein a determination is made whether the system is currently in a skid cycle. A negative determination causes progression to process block 1126. A positive determination causes progression to process block 1116 wherein the wheel speed error signal is integrated. The skid integrator can be calculated as:

$$\text{SkidInt}(i)_k = \text{SkidInt}(i)_{k-1} + Ws_{err}(i)*dt \quad (44)$$

Flow then continues to decision block 1118 wherein a determination is made whether the vehicle is in a skid. In one embodiment, a skid occurs when the following conditions are met: Ws$_{err}$ 138 is below the Control$_{max}$, and SkidInt is below TrigPt$_{skid}$.

A negative determination causes progression to termination block 1124. A positive determination causes progression to process block 1120 wherein the n$_{skid}$ is incremented and SkidInt is decremented. The n$_{skid}$ value can be calculated as:

$$n_{skid}(i)_k = n_{skid}(i)_{k-1} + 1 \quad (45)$$

The SkidInt value can be calculated as:

$$\text{SkidInt}(i)_k = \text{SkidInt}(i)_{k-1} - \text{TrigPt}_{skid}(i) \quad (46)$$

Progression then continues to process block 1122 wherein skid cycle acceleration (Ws'$_{skid}$) is calculated. The skid cycle acceleration can be calculated as:

$$Ws'_{skid}(i) = \text{SKDAGAIN} * Ws_{ref}(i) * (\text{SlipPt}/\text{Slip}_{max}) / (n_{skid}(i)^2 * dt) \quad (47)$$

where, as discussed previously, SKDAGAIN is tuning factor of about 0.3% and Slip$_{max}$ is the maximum slip ratio. Flow then continues to termination block 1124.

Figure 12A:
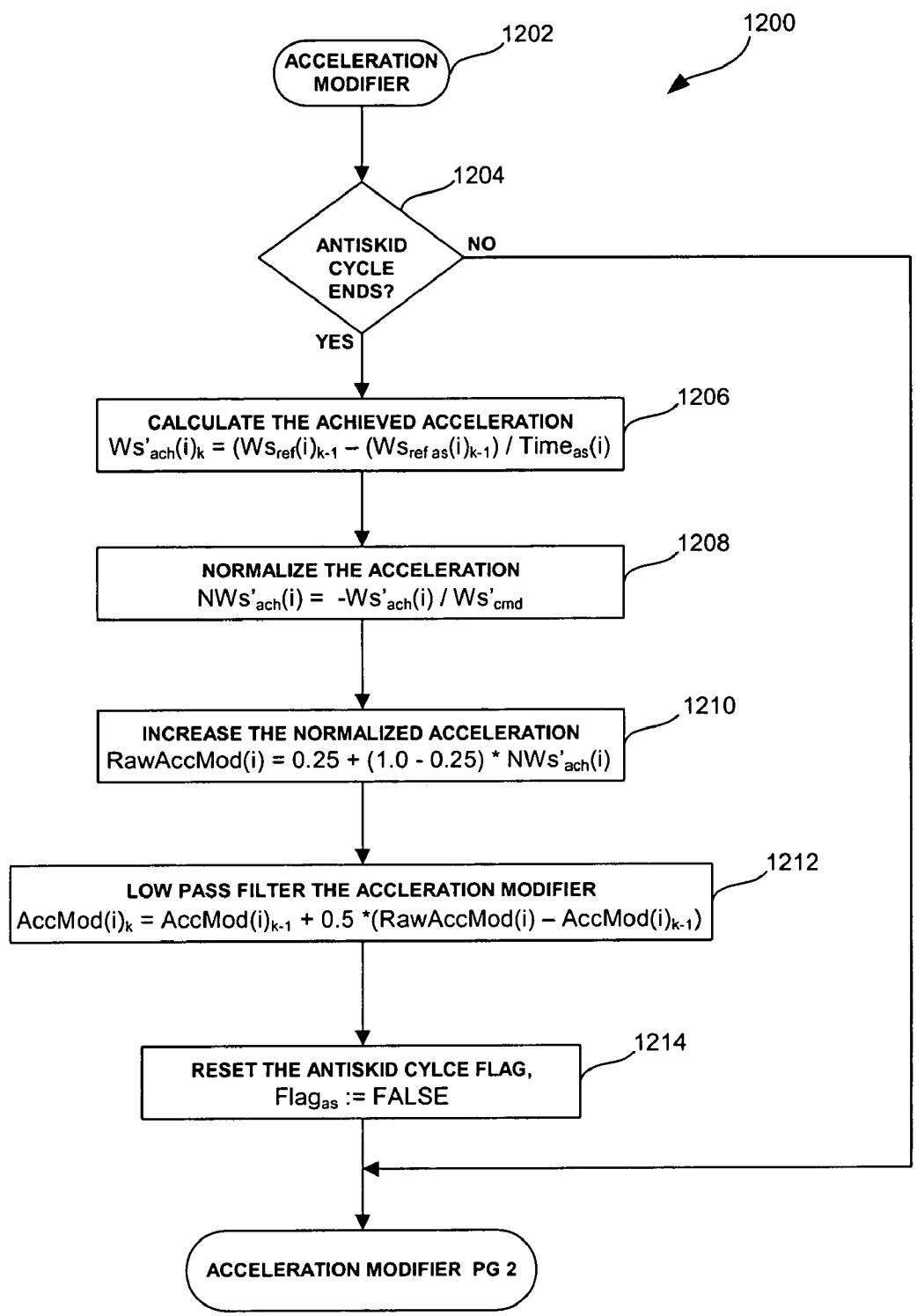
FIGS. 12A–B are flowcharts illustrating the functionality associated with calculating the acceleration modifier according to the present invention.
Figure 12B:
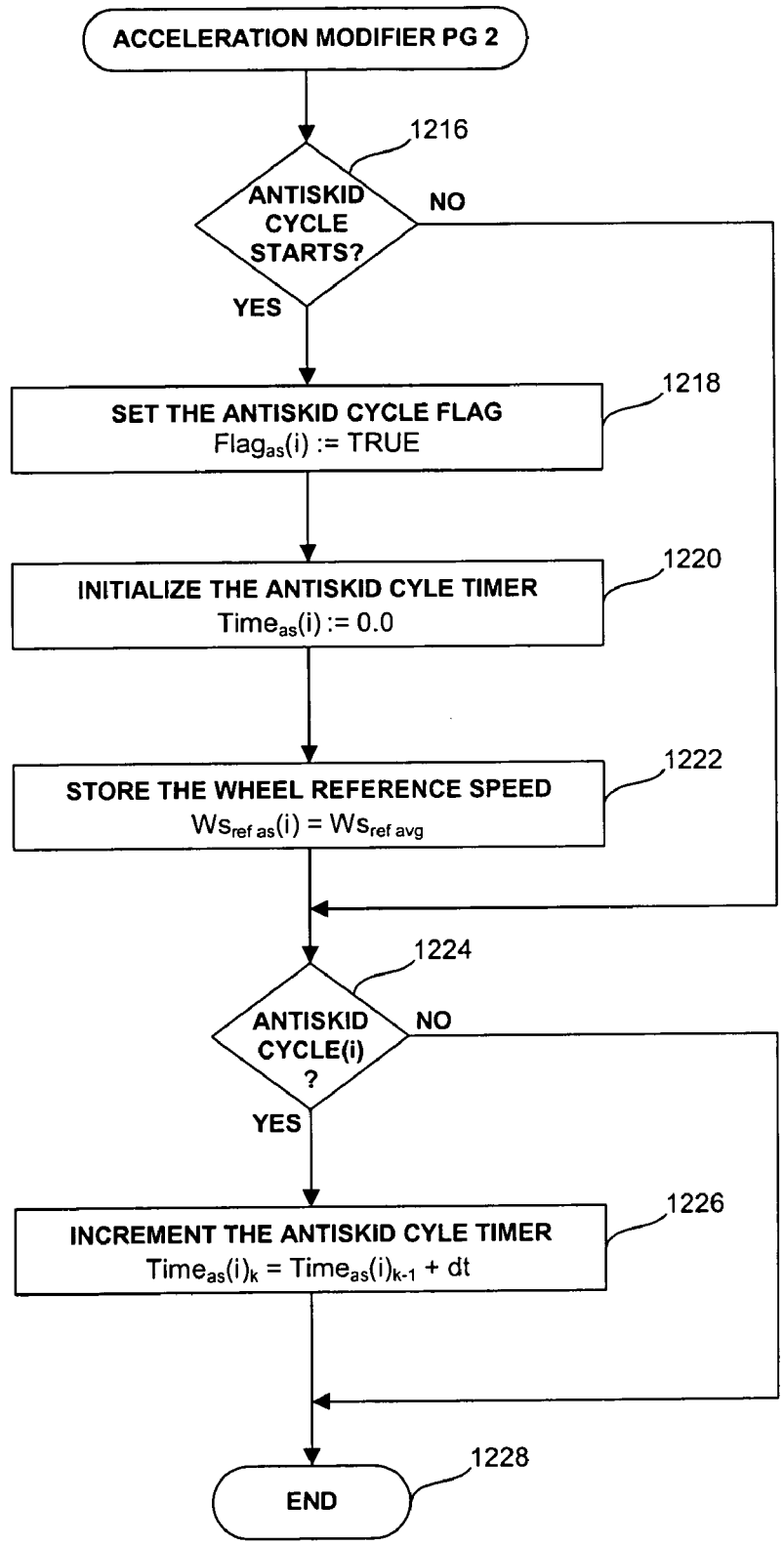

Turning next to FIG. 12A-B, flowcharts generally illustrating the functionality associated with calculating the AccMod 126 are provided. Flow for process block 1200 of FIG. 10 commences at start block 1202, from which progress is made to process block 1204, wherein a determination is made whether an antiskid cycle has ended. An antiskid cycle ends at a negative going set point crossing when the antiskid flag (Flag$_{as}$) is TRUE and the antiskid cycle timer (Time$_{as}$) is greater than half of the design cycle period.

A negative determination at decision block 1204 causes means that the antiskid cycle has not ended, thereby causing progression to decision block 1216. A positive determination at decision block 1204 causes progression to process block 1206 wherein the achieved acceleration (Ws'$_{ach}$) is calculated. The Ws'$_{ach}$ can be calculated as:

$$Ws'_{ach}(i)_k = (Ws_{ref}(i)_{k-1} - (Ws_{ref\_as}(i)_{k-1}) / \text{Time}_{as}(i) \quad (48)$$

where Ws$_{ref\_as}$ is the antiskid cycle wheel reference speed.

Progression then flows to process block 1208 wherein the achieved acceleration is normalized. The normalized achieved acceleration (NWs'$_{ach}$) can be calculated as:

$$NWs'_{ach}(i) = -Ws'_{ach}(i)/Ws'_{cmd} \quad (49)$$

Progression then continues to process block 1210 where the raw acceleration modifier (RawAccMod) is calculated. After being reduced, NWs'$_{ach}$ is driven to one by taking a weighted average of the current value with the maximum value where the maximum value is one. For example, a raw acceleration modifier (RawAccMod) can be calculated as:

$$\text{RawAccMod}(i) = 0.25 + (1.0 - 0.25) * NWs'_{ach}(i) \quad (50)$$

where 0.25 has been used as a exemplary value.

Flow then progresses to process block 1212 wherein a low pass filter is applied to the AccMod 126. The AccMod 126 can be calculated as:

$$\text{AccMod}(i)_k = \text{AccMod}(i)_{k-1} + 0.5 * (\text{RawAccMod}(i) - \text{AccMod}(i)_{k-1}) \quad (51)$$

Progression then continues to process block 1214 wherein the Flag$_{as}$ is set to FALSE (Flag$_{as}$:=FALSE).

Flow then continues to decision block 1216 wherein a determination is whether an antiskid cycle has started. An antiskid cycle starts at a negative going set point crossing when the Flag$_{as}$ is FALSE. A negative determination at decision block 1216 means that the antiskid cycle has not started and causes progression to decision block 1224.

A positive determination at decision block 1216 causes progression to process block 1218 wherein the Flag$_{as}$ is set to TRUE (Flag$_{as}$(i):=TRUE). Flow then continues to process block 1220 wherein the Time$_{as}$ is initialized (Time$_{as}$(i):= 0.0).

Progression continues to process block 1222 wherein the antiskid cycle wheel reference speed (Ws$_{ref\,as}$) is stored. The Ws$_{ref\,as}$ can be stored as:

$$Ws_{ref\,as}(i) = Ws_{ref\,avg} \quad (52)$$

Flow continues to decision block 1224 wherein a determination is made whether the vehicle is currently in an antiskid cycle. A negative determination at decision block 1224 causes progression to termination block 1228. A positive determination causes progression to process block 1226 wherein the Time$_{as}$ is incremented. The Time$_{as}$ can be incremented according to the following equation.

$$Time_{as}(i)_k = Time_{as}(i)_{k-1} + dt \quad (53)$$

Progression then continues to termination block 1228.

Figure 13:
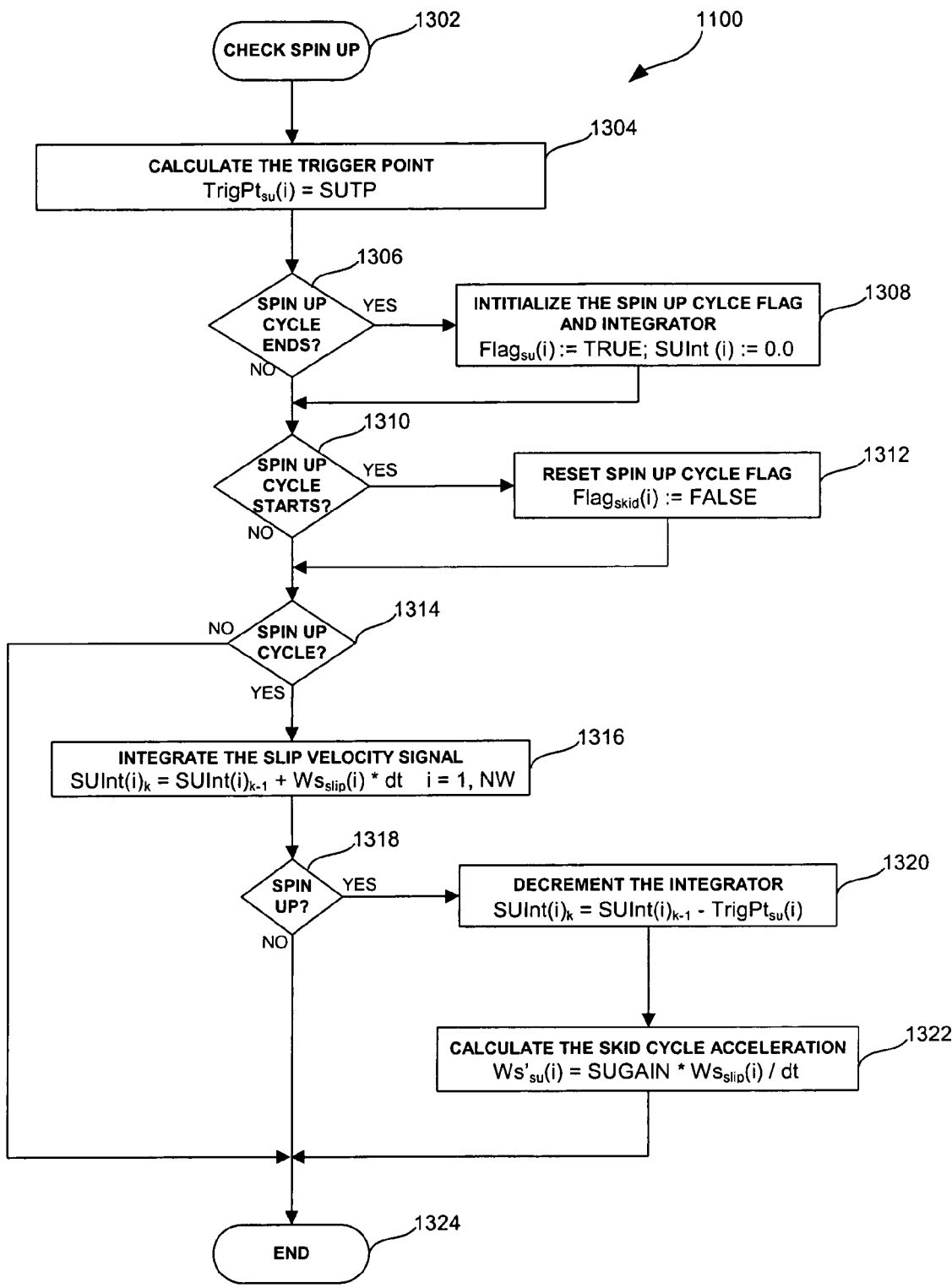
FIG. 13 is a flowchart generally illustrating the functionality associated with calculating spin up cycle acceleration according to the present invention.

Turning next to FIG. 13, a flowchart generally illustrating the functionality associated with calculating spin up cycle acceleration is provided. Flow for process block 1300 of FIG. 10 commences at start block 1302, from which progress is made to process block 1304, wherein the spin up trigger point (TrigPt$_{su}$) is calculated. The TrigPt$_{su}$ can be calculated as:

$$TrigPt_{su}(i) = SUTP \quad (54)$$

where the value of SUTP is calculated to desensitize the algorithm to rebound oscillations that occur during wheel spin up. The rebound oscillations, due to the known aircraft phenomena of gear walk, for example, increase the measured wheel speed above the free rolling unbraked speed. The amplitude and frequency of this oscillation varies from aircraft to aircraft. Ideally, regardless of aircraft, the reset ideally triggers after one half cycle of the oscillation to minimize its effect. Therefore, the value of SUPT can be calculated as the integral of one half cycle of a sine wave with the aircraft specific amplitude and frequency of the corrupting signal.

Progression then continues to decision block 1306, wherein a determination is made whether the spin up cycle has ended. A spin up cycle ends when the following conditions are met: the Ws$_{slip}$ is greater than zero, the spin up integrator is greater than −0.4*TrigPt$_{su}$, and the spin up cycle flag (Flag$_{su}$) is TRUE. A positive determination at decision block 1306 causes progression to process block 1308 wherein the spin up cycle flag (Flag$_{su}$) and the spin up integrator (SUInt) are reset (Flag$_{su}$(i):=TRUE and SUInt(i):=0.0). Progression then continues to decision block 1310.

A negative determination at decision block 1306 causes progression to decision block 1310. At decision block 1310, a determination is made whether a spin up cycle has started. A spin up cycle starts when the following conditions are met: the Ws$_{slip}$ is less than zero, and the Flag$_{su}$ is FALSE. A positive determination at decision block 1310 causes progression to process block 1312 wherein the Flag$_{su}$ is set to FALSE. Progression then continues to decision block 1314.

A negative determination at decision block 1310 causes progression to decision block 1314 wherein a determination is made whether the system is currently in a spin up cycle. A negative determination causes progression to termination block 1324. A positive determination causes progression to process block 1316 wherein the slip velocity signal is integrated. The spin up integrator can be calculated as:

$$SUInt(i)_k = SUInt(i)_{k-1} + Ws_{slip}(i) * dt \quad i=1, NW \quad (55)$$

Flow then continues to decision block 1318 wherein a determination is made whether spin up conditions have been met. Spin up occurs when SUInt is below TrigPt$_{su}$. A negative determination causes progression to termination block 1324. A positive determination causes progression to process block 1320 wherein the SUInt is decremented. The SUInt can be decremented as follows:

$$SUInt(i)_k = SUInt(i)_{k-1} - TrigPt_{su}(i) \quad (56)$$

Progression then continues to process block 1322 wherein spin up cycle acceleration (Ws'$_{su}$) is calculated. The spin up cycle acceleration can be calculated as:

$$Ws'_{su}(i) = SUGAIN * Ws_{slip}(i)/dt \quad (57)$$

where SUGAIN is a number between zero and one. If one is used, the new reference velocity 140 will equal the Ws 118. If SUGAIN is 0.5, the new Ws$_{ref}$ 140 will be half way between the current Ws 118 and the current Ws$_{ref}$ 140, As such it is a wheel speed noise rejection feature and aircraft specific. However, SUGAIN is typically between 0.75 and 0.95. Flow then continues to termination block 1324 wherein flow is terminated.

Figure 14:
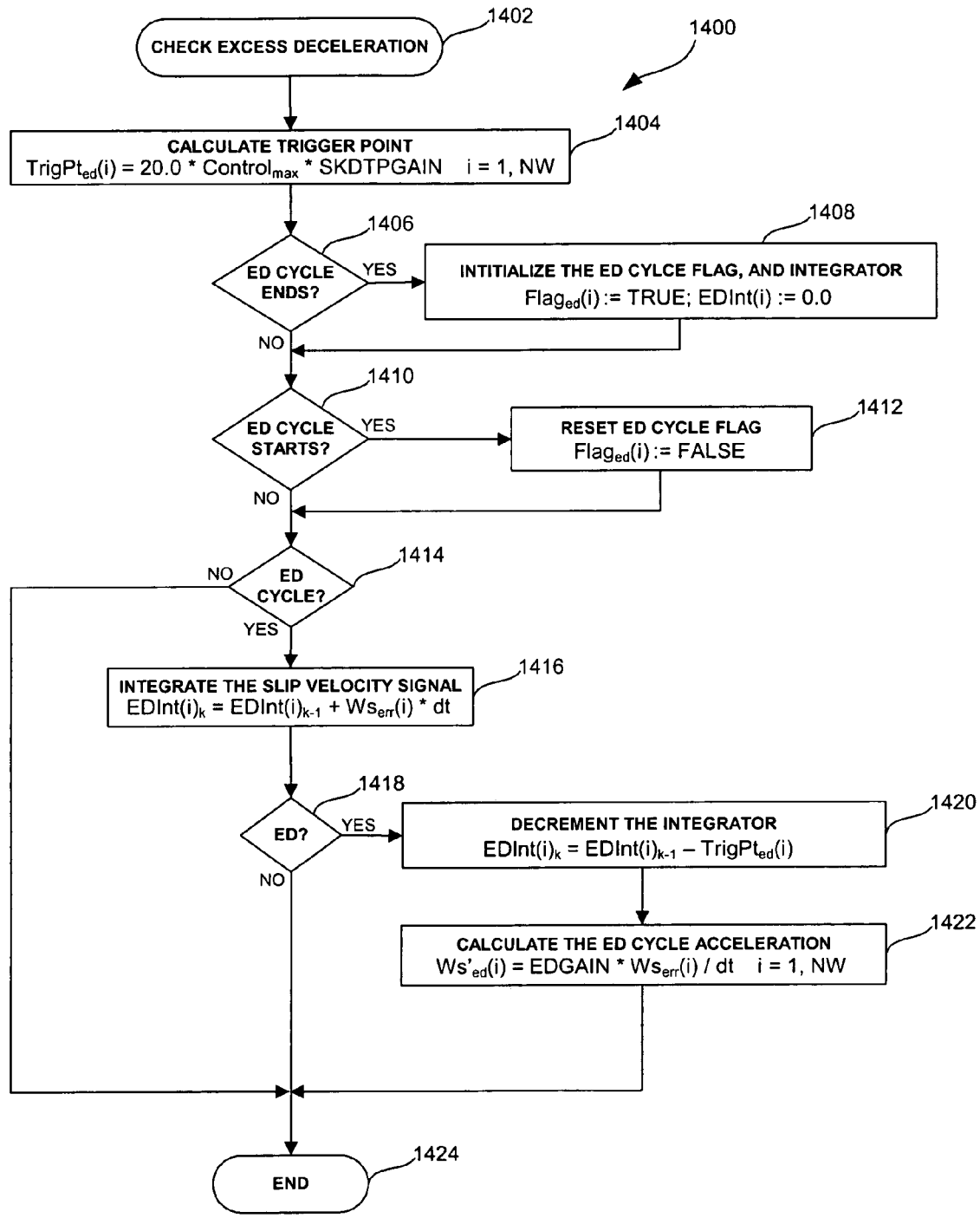
FIG. 14 is a flowchart generally illustrating the functionality associated with calculating excess deceleration cycle acceleration.

Turning next to FIG. 14, a flowchart generally illustrating the functionality associated with calculating excess deceleration cycle acceleration is provided. Excess deceleration can occur when the reverse thrust or other sources of deceleration are causing the vehicle to decelerate faster than the autobrake setting. Typically, this occurs during maximum thrust conditions with a light aircraft and high runway friction. Excess deceleration compensation routines are initiated when the following conditions are occur: the Ws 118 is below Ws$_{sp}$ and the last excess deceleration cycle has ended. The condition is terminated when: the Ws 118 is greater than or equal to the Ws$_{sp}$ or the slip is more than 0.25.

Flow for process block 1400 of FIG. 10 commences at start block 1402, from which progress is made to process block 1404, wherein the excess deceleration trigger point (TrigPt$_{ed}$) is calculated. The TrigPt$_{ed}$ can be calculated as:

$$TrigPt_{ed}(i) = 20.0 * Control_{max} * SKDTPGAIN \quad i=1, NW \quad (58)$$

Progression then continues to decision block 1406, wherein a determination is made whether the excess deceleration cycle has ended. In one embodiment, an excess deceleration cycle ends when the following conditions are met: the Ws$_{err}$ 138 is greater than zero and the excess deceleration integrator (EDInt) is greater than −0.1*TrigPt$_{ed}$, and the excess deceleration cycle flag (Flag$_{ed}$) is TRUE. The excess deceleration cycle also ends if the Slip is greater than 0.25. A positive determination at decision block 1406 causes progression to process block 1408 wherein the excess Flag$_{ed}$ and the EDInt are reset (Flag$_{ed}$(i):=TRUE and EDInt(i):=0.0). Progression then continues to decision block 1410.

A negative determination at decision block 1406 causes progression to decision block 1410. At decision block 1410, a determination is made whether an excess deceleration cycle has started. An excess deceleration cycle starts when the following conditions are met: the Ws$_{err}$ 138 is less than zero, and the Flag$_{ed}$ is FALSE. A positive determination at decision block 1410 causes progression to process block 1412 wherein the Flag$_{ed}$ is set to FALSE. Progression then continues to decision block 1414.

A negative determination at decision block 1410 causes progression to decision block 1414 wherein a determination is made whether the system is currently in an excess deceleration cycle. A negative determination causes progression to termination block 1424. A positive determination causes progression to process block 1416 wherein the error signal is integrated. The excess deceleration condition integrator can be calculated as:

$$EDInt(i)_k = EDInt(i)_{k-1} + Ws_{err}(i) * dt \quad (59)$$

Flow then continues to decision block 1418 wherein a determination is made whether excess deceleration conditions have been met. An excess deceleration condition occurs when EDInt is below $TrigPt_{ed}$. A negative determination causes progression to termination block 1424. A positive determination causes progression to process block 1420 wherein the EDInt is decremented. The EDInt can be decremented according to the following:

$$EDInt(i)_k = EDInt(i)_{k-1} - TrigPt_{ed}(i) \quad (60)$$

Progression then continues to process block 1422 wherein excess deceleration condition cycle acceleration ($Ws'_{ed}$) is calculated. The $Ws'_{ed}$ can be calculated as:

$$Ws'_{ed}(i) = EDGAIN * Ws_{err}(i)/dt \quad i=1, NW \quad (61)$$

where EDGAIN is a number between zero and one. Ideally, EDGAIN is one, which results in resetting the $Ws_{sp}$ equal to the Ws 118. It will understood that the wheel speed signal may have noise, in which case EDGAIN will not equal one. If it is 0.5, the new $Ws_{sp}$ will be half way between the current Ws 118 and the current $Ws_{sp}$. As such it is a wheel speed noise rejection feature and aircraft specific. However, EDGAIN is typically between 0.75 and 0.95. Flow then continues to termination block 1424 wherein flow is terminated.

It will be understood that there is an inherent prioritizing of stopping distance over yaw control in the system described herein. However, yaw control can be prioritized over stopping distance. In such a system, the lowest acceleration modifiers and biggest skid accelerations can be used instead of averaging the control accelerations and acceleration modifiers. Since the lowest acceleration modifiers and biggest skid accelerations are caused by the wheel on the lowest friction runways, the effect is to provide the lowest drag to each axle and balance the yaw moments. In addition, it will also be appreciated that any combination of yaw control and stopping distance priorities can also be utilized. In addition, while the systems described herein encompass brake control, autobrake and antiskid functionality, the system can be configured to perform stand alone autobrake or antiskid as well combined autobrake and antiskid. Further, while the system can also be configured to operate on a single wheel, or on sets of wheel pairs, instead of operating on the braked wheels as described herein.

What is claimed is:

1. A method for controlling braking comprising:
    calculating a commanded acceleration from a brake command received from a pilot or an autobrake system;
    calculating an achieved acceleration from a change in reference wheel speed during an antiskid cycle;
    using the commanded acceleration to normalize the achieved acceleration;
    calculating an acceleration modifier from the normalized achieved acceleration; and
    using the acceleration modifier to generate an output pressure corresponding to a pressure to be applied to a brake.

2. The method of claim 1 further comprising calculating a desired acceleration from the acceleration modifier and the commanded acceleration.

3. The method of claim 2 further comprising calculating a reference acceleration from the desired acceleration.

4. The method of claim 2 wherein the reference acceleration is derived from the desired acceleration and a control acceleration.

5. The method of claim 1 further comprising calculating a skid cycle acceleration, a spin up cycle acceleration and an excess deceleration acceleration.

6. The method of claim 5 wherein skid cycle acceleration calculations commence when a slip ratio is greater than a predetermined maximum and the integral of negative difference between a measured wheel speed and a wheel speed set point is less than a predetermined value.

7. The method of claim 6 wherein skid cycle acceleration calculations terminate when the slip ratio is less than a predetermined maximum or the integral of negative difference between a measured wheel speed and a wheel speed set point is greater than a predetermined value.

8. The method of claim 5 wherein spin up acceleration calculations commence when measured wheel speed is greater than free-rolling unbraked wheel speed.

9. The method of claim 5 wherein excess deceleration acceleration calculations commence when measured wheel speed falls below a wheel speed set point and the last excess deceleration cycle has ended and terminate when the measured wheel speed is greater than or equal to the wheel speed set point or slip is calculated to be more than about 0.25.

10. The method of claim 5 wherein the skid cycle acceleration is derived from wheel reference speed, the spin up acceleration is derived from a slip velocity.

11. The method of claim 5 wherein the excess deceleration acceleration is derived from the difference between a measured wheel speed and a wheel speed set point.

12. The method of claim 5 wherein a control acceleration is derived from the skid cycle acceleration, the spin up acceleration, and the excess deceleration acceleration.

13. A system for calculating an acceleration modifier for use in controlling the speed of a wheel of a vehicle comprising:
    an acceleration controller configured to calculate a commanded acceleration received from a brake command from a pilot or autobrake system;
    a control monitor configured to receive the commanded acceleration from the first controller, calculate an achieved acceleration from a change in reference wheel speed during an antiskid cycle, normalize the achieved acceleration using the commanded acceleration, and calculate an acceleration modifier from the normalized achieved acceleration.

14. The system of claim 13 wherein the acceleration controller and control monitor are implemented as a single controller.

15. The system of claim 13 wherein the acceleration controller is further configured to calculate a desired acceleration from the acceleration modifier and the commanded acceleration.

16. The system of claim 15 wherein the acceleration controller is further configured to calculate a reference acceleration from the desired acceleration.

17. The system of claim 16 further comprising a trajectory controller configured to calculate a reference speed from the reference acceleration and an acceleration error from the desired acceleration.

18. The system of claim 17 further comprising a radii compensator configured to generate a wheel speed ratio reflecting tire radius discrepancies and wherein the trajectory generator is further configured to use the wheel speed ratio to generate the acceleration error.

19. The system of claim 13 further comprising a pressure controller configured to generate an output pressure corresponding to a pressure to be applied to a brake of a wheel.

* * * * *